US008196093B2

(12) United States Patent
Son et al.

(10) Patent No.: US 8,196,093 B2
(45) Date of Patent: Jun. 5, 2012

(54) APPARATUS AND METHOD FOR COMPONENTIZING LEGACY SYSTEM

(75) Inventors: Kyoung-ho Son, Suwon-si (KR); Seok-jin Hong, Seoul (KR); Kyung-sub Min, Seoul (KR); Dae-sung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1281 days.

(21) Appl. No.: 11/865,944

(22) Filed: Oct. 2, 2007

(65) Prior Publication Data
US 2008/0196009 A1 Aug. 14, 2008

(30) Foreign Application Priority Data

Feb. 14, 2007 (KR) ........................ 10-2007-0015487

(51) Int. Cl.
*G06F 9/44* (2006.01)
*G06F 7/00* (2006.01)
(52) U.S. Cl. ......... 717/107; 717/106; 717/121; 707/762
(58) Field of Classification Search .................. None
See application file for complete search history.

(56) References Cited

U.S. PATENT DOCUMENTS

| 6,601,233 B1* | 7/2003 | Underwood .................. 717/102 |
| 6,654,950 B1* | 11/2003 | Barnishan .................... 717/136 |
| 2001/0051974 A1* | 12/2001 | Saad .............................. 709/202 |
| 2002/0069400 A1* | 6/2002 | Miloushev et al. ........... 717/108 |
| 2003/0058277 A1* | 3/2003 | Bowman-Amuah .......... 345/765 |
| 2003/0226132 A1* | 12/2003 | Tondreau et al. ............. 717/116 |
| 2004/0031015 A1* | 2/2004 | Ben-Romdhane et al. ... 717/107 |
| 2004/0093593 A1 | 5/2004 | Jhanwar et al. |
| 2005/0138603 A1* | 6/2005 | Cha et al. ...................... 717/120 |
| 2007/0067756 A1* | 3/2007 | Garza ............................ 717/136 |
| 2007/0198562 A1* | 8/2007 | Kulkarni et al. .............. 707/101 |
| 2007/0260633 A1* | 11/2007 | Rapicault et al. ......... 707/103 R |
| 2010/0138809 A1* | 6/2010 | Shenfield et al. ............. 717/104 |
| 2011/0035725 A9* | 2/2011 | Naik et al. .................... 717/108 |

FOREIGN PATENT DOCUMENTS

| JP | 9-134282 A | 5/1997 |
| KR | 10-0496868 B1 | 6/2005 |

\* cited by examiner

*Primary Examiner* — Isaac Tecklu
(74) *Attorney, Agent, or Firm* — Sughrue Mion, PLLC

(57) ABSTRACT

Provided are an apparatus and method of componentizing a legacy system that reconstructs software components, which are included in the legacy system, as abstract or logical modules according to the association between the components. An apparatus for componentizing a legacy system includes a legacy code analyzing unit which analyzes the association between one or more legacy codes, which are included in the legacy system, a component generating unit which generates data for defining one or more components by referring to the analyzed association, a component analyzing unit which analyzes the association between the components, and a data updating unit which updates the data by referring to the association between the components.

17 Claims, 26 Drawing Sheets

FIG. 5A

```
component A {
    provides {
        I_A ipI_A;
    }
}
```
— 510

```
Interface I_A {
    symbols from Dir1;
    symbols from Dir3;
    symbols from Dir4;
    // or
    header-file = [header files from Dir1];
    header-file = [header files from Dir3];
    header-file = [header files from Dir4];
}
```
— 520

FIG. 5B
```
component B {
    provides {
        I_B ipI_B;
    }
}
```
530
```
interface I_B {
    symbols from Dir2;
    symbols from Dir5;
    // or
    header-file = [header files from Dir2];
    header-file = [header files from Dir5];
}
```
540

FIG. 7A

```
[B_A.bcdl]

build-component B_A [
    properties {
        version =   "1.0.0" ;
        source-id = "6ba7b814-3245a309s" ;
        build-type = "makefile" ;
        build-file = "Makefile.B_A" ;
        source-list = "B_A.filelist" ;
    }
    provides {
    static library "out/a.o" ;
    }
    build-actions {
    all = "all" ;
    clean = "clean" ;
    }
};
```
~710

FIG. 7B

```
[B_A.filelist]

[header]
Header files from Dir2;
Header files from Dir5;

[source]
Source files from Dir2;
Source files from Dir5;

[build]
Makefile.B_A;

[import header]
Header files from reference directories;
```
~720

```
component T {
    contains {
        L cL;
        M cM;
        E cE;
        F cF;
    }
    provides {
        LA lpl_A;
        LB lpl_B;
        LC lpl_C;
        LD lpl_D;
        LE lpl_E;
        LF lpl_F;
    }
    connects {
        connect cT.lpl_A to cL.lpl_A;
        connect cT.lpl_B to cL.lpl_B;
        connect cT.lpl_C to cM.lpl_C;
        connect cT.lpl_D to cM.lpl_D;
        connect cT.lpl_E to cE.lpl_E;
        connect cT.lpl_F to cF.lpl_F;
        connect cL.lrl_F to cF.lpl_F;
        connect cM.lrl_E to cF.lpl_E;
    }
}
```

1320

```
component T {
    contains {
        L cL;
        M cM;
        N cN;
    }
    provides {
        LA lpl_A;
        LB lpl_B;
        LC lpl_C;
        LD lpl_D;
        LE lpl_E;
        LF lpl_F;
    }
    connects {
        connect cT.lpl_A to cL.lpl_A;
        connect cT.lpl_B to cL.lpl_B;
        connect cT.lpl_C to cM.lpl_C;
        connect cT.lpl_D to cM.lpl_D;
        connect cT.lpl_E to cN.lpl_E;
        connect cT.lpl_F to cN.lpl_F;
        connect cL.lrl_F to cN.lpl_F;
        connect cM.lrl_E to cN.lpl_E;
    }
}
```

APPARATUS AND METHOD FOR COMPONENTIZING LEGACY SYSTEM

CROSS REFERENCE TO RELATED APPLICATION

This application claims priority from Korean Patent Application No. 10-2007-0015487 filed on Feb. 14, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to componentizing a legacy system, and more particularly, to an apparatus and method of componentizing a legacy system that reconstructs software components, which are included in the legacy system, as abstract or logical modules according to the association between the components.

2. Description of the Related Art

In recent years, with the technical development of the software field, the importance of software management on digital apparatuses has increased. This is because functions provided by hardware and functions provided by a combination of hardware and software are being provided by only software.

A group of apparatuses having similar characteristics may be developed in such a way that each apparatus share the same platform but include a separate module for providing a predetermined function.

A component model is a concept that all function elements constituting one software system are subdivided and an abstract or a logical module structure to be easily applied to various kinds of development is provided through the association between the elements. The component model may be classified into a top-down method, in which a system is developed on the basis of the component model at the beginning of system design, and a bottom-up method, in which an existing system is analyzed to form a component model.

Modules constituting a software system are designed such that they can individually provide functions. When the functions are incorporated, the system can perform its own operation. Further, since some of the modules, which are rewritten for improving the functions thereof, are applied to the system, the software system that is capable of adapting itself to various execution environments can be implemented.

The reuse of software is achieved by defining common modules between two software systems having similar functions, and extending the functions of the common modules or adding connection codes of the common modules to the software system. Efficiency of system development is increased by the reuse of software.

A known analysis method that constructs a component model using the bottom-up method only provides software developers with one-dimensional information on the basis of reference and call information between source codes. Therefore, it is difficult for the developers to recognize a boundary between the components that are included in the developed software system. Accordingly, the developers can only construct the component model by a manual operation. That is, the developers construct the component model by the manual operation using analyzed information, which unnecessarily results in a waste of time and money when updating the existing software system.

Therefore, there is an increasing demand for a technology that automatically constructs the existing software system as a component model without needing the involvement of the developers.

SUMMARY OF THE INVENTION

Exemplary embodiments of the present invention overcome the above disadvantages and other disadvantages not described above. In addition, the present invention is not required to overcome the disadvantages described above, and an exemplary embodiment of the present invention may not overcome any of the problems described above.

An aspect of the present invention provides an apparatus and method of componentizing a legacy system that automatically reconstructs software components, which are included in the legacy system, as abstract or logical modules according to the association between the components.

Aspects of the present invention are not limited to those mentioned above, and other objects of the present invention will be apparently understood by those skilled in the art through the following description.

According to an aspect of the present invention, there is a provided an apparatus for componentizing a legacy system, the apparatus including a legacy code analyzing unit which analyzes the association between one or more legacy codes, which are included in the legacy system, a component generating unit which generates data for defining one or more components by referring to the analyzed association, a component analyzing unit which analyzes the association between the components, and a data updating unit which updates the data by referring to the association between the components.

According to another aspect of the present invention, there is a provided a method of componentizing a legacy system, the method including analyzing the association between one or more codes, which are included in the legacy system, generating data for defining one or more components by referring to the analyzed association, analyzing the association between the components, and updating the data by referring to the association between the components.

BRIEF DESCRIPTION OF THE DRAWINGS

The above and other aspects of the present invention will become more apparent by describing in detail exemplary embodiments thereof with reference to the attached drawings in which:

FIGS. 5A and 5B are diagrams illustrating function level data and interface data with respect to the components shown in FIG. 4;

FIGS. 7A and 7B are diagrams illustrating build level data and a source code list with respect to components shown in FIG. 6;

FIG. 13 is a diagram illustrating function level data with respect to the composite component shown in FIG. 12;

DESCRIPTION OF THE EXEMPLARY EMBODIMENTS

Figure 1:
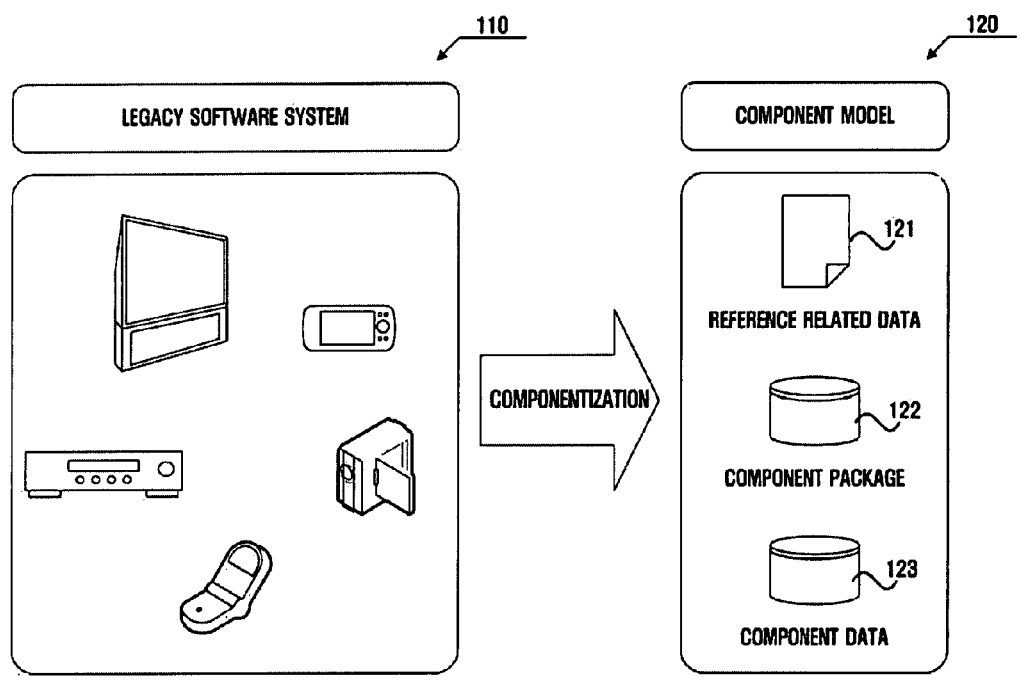
FIG. 1 is a conceptual view illustrating a case where a legacy system is constructed as a component model, according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

The present invention will now be described more fully with reference to the accompanying drawings, in which exemplary embodiments of the present invention are shown.

FIG. 1 is a conceptual view illustrating a case where a legacy system is constructed as a component model, according to an exemplary embodiment of the present invention. In FIG. 1, a component model 120 is constructed according to a bottom-up method.

That is, in FIG. 1, abstract or logical modules that provide predetermined functions are extracted from a software system 110 sharing shares the same platform (hereinafter, referred to as a "legacy system"), and the extracted modules are constructed as components.

To this end, an apparatus for componentizing the legacy system 110 according to the exemplary embodiment of the present invention analyzes codes, which are included in the legacy system 110, constructs one or more files required for performing a predetermined function as one component to generate component data 123. A plurality of components is included in one component package 122.

Meanwhile, when the entire legacy system is constructed as a component model or a new legacy system is applied to the constructed component model to construct a new component model, the apparatus for componentizing a legacy system can refer to reference related data 121.

The reference related data 121 includes the association between the codes, and build information. A component apparatus 200 may continuously update the reference related data 121 while constructing the component model 120.

Figure 2:
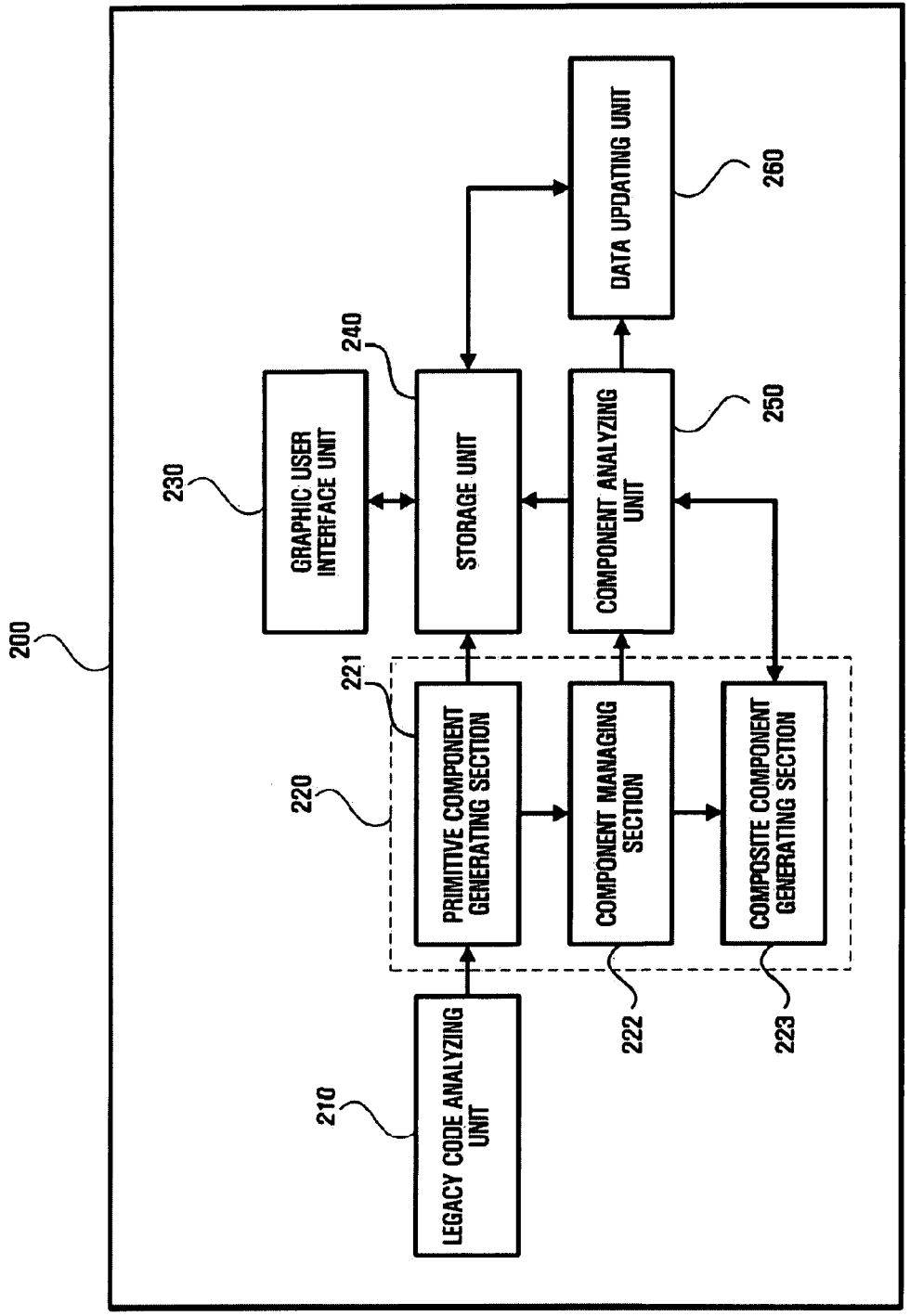
FIG. 2 is a block diagram illustrating an apparatus for componentizing a legacy system according to an exemplary embodiment of the present invention.

FIG. 2 is a block diagram illustrating an apparatus for componentizing a legacy system according to an exemplary embodiment of the present invention. In FIG. 2, the apparatus for componentizing a legacy system (hereinafter, simply referred to as a "component apparatus") 200 includes a legacy code analyzing unit 210, a component generating unit 220, a graphic user interface unit 230, a storage unit 240, a component analyzing unit 250, and a data updating unit 260.

The legacy code analyzing unit 210 analyzes the association between one or more legacy codes, which are included in the legacy system. Here, the legacy system means a group of software that performs overall control of a specified apparatus, and includes at least one legacy code that performs various functions of the apparatus.

Further, the legacy code is a code that is written by the developer, and means an uncompiled source code. In the present invention, it is assumed that the legacy code includes header files and source files.

Further, a directory that includes at least one source file constructing one component, which performs a specified function in the legacy system, and a corresponding header file are hereinafter referred to as a component unit directory.

Therefore, the legacy code analyzing unit 210 can analyze the association between the legacy codes by using least one of header file reference information, function call information, and symbol reference information, all of which are included in the legacy code. That is, the legacy code analyzing unit 210 searches for a list of header files, which are being referred to, from the individual header files, and the function call association and the symbol reference association in the source file.

Meanwhile, in respect to the legacy code, it may be impossible to analyze the actual association between the codes only with the reference between the header files. This is because, even if a specified header file is referred to by a different head file, there may be no function call or code for symbol reference in the source file.

Therefore, the legacy code analyzing unit 210 can analyze the association between the legacy codes by selectively using the header file reference information, the function call information, or the symbol reference information according to a prescribed analysis range.

For example, an analysis range is divided into first to third operations. In the first operation of the analysis range, the legacy code analyzing unit 210 analyzes the legacy code by using only the header file reference information. In the second operation of the analysis range, the legacy code analyzing unit 210 analyzes the legacy code by using only the function call information. In the third operation of the analysis range, the legacy code analyzing unit 210 analyzes the legacy code by using only the symbol reference information.

Further, the legacy code analyzing unit 210 may analyze the legacy code by a combination of the header file reference information, the function call information, and the symbol reference information. For example, in the first operation of the analysis range, the legacy code analyzing unit 210 analyzes the legacy code by using only the header file reference information. In the second operation of the analysis range, the legacy code analyzing unit 210 analyzes the legacy code by using the header file reference information and the function call information. In the third operation of the analysis range, the legacy code analyzing unit 210 analyzes the legacy code by using the header file reference information, the function call information, and the symbol reference information.

The analysis result by the legacy code analyzing unit 210 is transmitted to the component generating unit 220. The component generating unit 220 generates data for defining at least one component by referring to the analyzed association. That is, the component generating unit 220 generates a component, which may be a primitive component or a composite component.

In order to generate components, the component generating unit 220 may include a primitive component generating section 221, a component managing section 222, and a composite component generating section 223. Data is generated by the primitive component generating section 221.

Here, the data includes function level data, build level data, and interface data, and may exist as a file in a document format.

The function level data includes the association between a component and a different component that provide and require interfaces with respect to each other. When the component is a composite component, the function level data includes the association between components included in the composite component.

The build level data includes a library or execution file information generated as a result of building the component. When the component is a composite component, the build level data includes build information of components that are included in the composite component.

The interface data includes interfaces that are provided by the components.

Each of the components may have one or more component unit directories that are formed by a combination of the legacy codes. The primitive component generating section 221 generates a directory (hereinafter, referred to as a "unit directory") that includes the component unit directories, and includes the build level data in the unit directory. Here, a list of the component unit directories may be generated by the legacy code analyzing unit 210.

The primitive component generating section 221 generates at least one primitive component. The component managing section 222 analyzes the association between the primitive components and updates the list of the component unit directories by using the data (function level data, build level data, and interface data) that defines the individual primitive components. That is, a list of new components that are generated (hereinafter, simply referred as a "component management list") is added to the list of the residual components from the components included in the legacy system.

Further, the composite component generating section 223 generates a composite component that includes one or more primitive components by referring to the association between the primitive components. Here, the composite component generating section 223 may generate a composite component that includes at least one primitive and an additional composite component.

A range of the primitive components or the additional composite component that is included in the composite component may be manually or automatically determined. When the range is automatically determined, a build file included in the legacy system may be referred to.

The component analyzing unit 250 analyzes the association between the generated components. That is, the component analyzing unit 250 analyzes the association between the components by using the generated data.

At this time, when a composite component is generated by the composite component generating section 223, the component analyzing unit 250 may extract interfaces that are provided or required by the primitive components or the additional composite component included in the composite component. The extracted interfaces are transmitted to the data updating unit 260. The data updating unit 260 updates the data by referring to the extracted interfaces.

The component generation, the component analysis, and the data update are repeatedly performed until a component model with respect to the entire legacy system is completed. When a component model, to which an additional legacy code is applied, is constructed after the component model is completed, the component apparatus 200 may simply construct a new component model by analyzing the additional legacy code and updating data without constructing a component model with respect to the entire legacy system again.

The storage unit 240 stores the function level data, the build level data, and the interface data. That is, the data generated by the primitive component generating section 221 is stored in the storage unit 240, and the data updating unit 260 updates the data stored in the storage unit 240. Further, the storage unit 240 may store the component management list and the analysis range by the legacy code analyzing unit 210.

The storage unit 240 is a module, such as a hard disk, a flash memory, a CF card (Compact Flash Card), an SD card (Secure Digital Card), an SM card (Smart Media Card), an MMC (Multimedia Card), or a memory stick, through which information can be input and output. The storage unit 240 may be provided in the component apparatus 200 or in a separate apparatus. When the storage unit 240 is provided in the separate apparatus, a communication unit (not shown) that can perform communication with the separate apparatus may be provided in the component apparatus 200.

The graphic user interface unit 230 displays the data generated according to the exemplary embodiment of the present invention, that is, the function level data, the build level data, or the interface data. The developer may check the generated data and modify the data using the graphic user interface unit 230.

A graphic user interface that displays data using the graphic user interface unit 230 will be described below in detail with reference to FIGS. 20 to 24.

Figure 3:
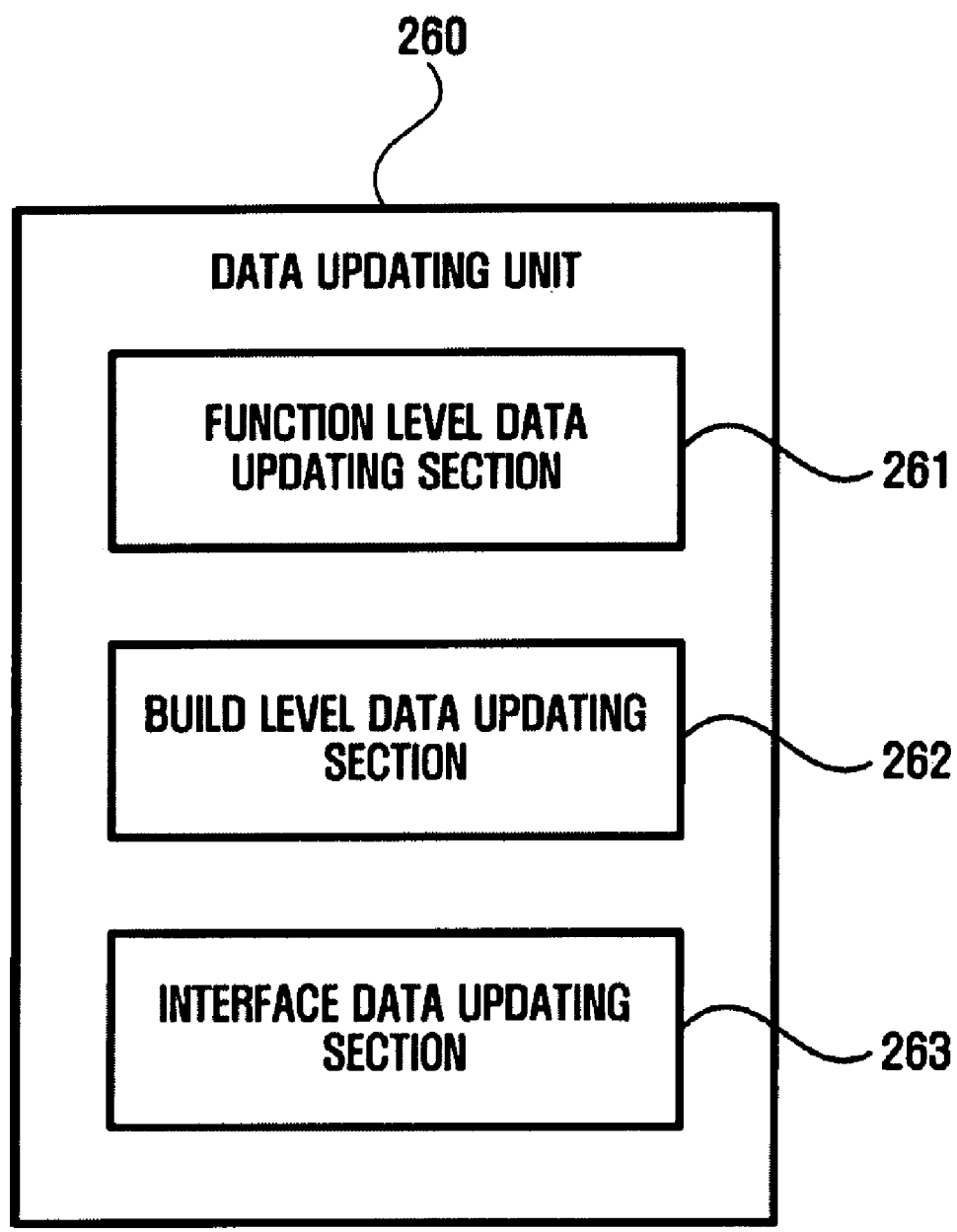
FIG. 3 is a block diagram illustrating the detailed structure of a data updating unit shown in FIG. 2.

FIG. 3 is a block diagram illustrating the detailed structure of the data updating unit 260 shown in FIG. 2. The data updating unit 260 includes a function level data updating section 261, a build level data updating section 262, and an interface data updating section 263.

The function level data updating section 261 updates the function level data. Here, the function level data may be composed of "provides", "requires", "contains", "connects", and "configuration-variables" syntaxes.

The "provides" syntax defines an interface that represents a function to be provided by a corresponding component (hereinafter, simply referred to as "provides interface"). The "requires" syntax defines an interface of a different component that is required by the corresponding component (hereinafter, simply referred to as "requires interface"). When the corresponding component is a composite component, the "contains" syntax defines a list of components that are included in the composite component, that is, a component management list. The "connects" syntax defines the association between components that are included in the composite component when the corresponding component is a composite component. The "configuration-variables" syntax gives variability with respect to a function of the corresponding component when the corresponding component is a composite component. The "configuration-variables" syntax may include "option" and "switch" syntaxes in determining whether or not to include a predetermined component in the composite component.

The build level data updating section 262 updates the build level data. Here, the build level data may include "properties", "provides", "requires", "contains", and "configuration-variables" syntaxes.

The "properties" syntax includes a version of the corresponding component, an ID of a source code, a build type, a name of a build file, a position of the build file, and a list of source codes. The "properties" syntax represents basic information required for building the corresponding component (hereinafter, simply referred to as "build information"). The "provides" syntax represents a library or execution file information generated as a result of building the corresponding component. The "requires" syntax represents external library information required for building the corresponding component. The "contains" syntax represents a list of build level data with respect to components included in the composite component when the corresponding component is a composite component. The "configuration-variables" syntax gives variability for building the corresponding component when the corresponding component is a composite component, and represents whether a specified component in the composite component is built or not.

The interface data updating section 263 updates the interface data. Here, the interface data is composed of functions and symbols that may be referred to by a different component.

The interface data is generated by the primitive component generating section 221. The primitive component generating section 221 may generate interface data that includes the functions and symbols or interface data that only includes a list of the header files included in the component unit directory. Then, the interface data updating section 263 may update the generated interface data according to the type of interface data.

Figure 4:
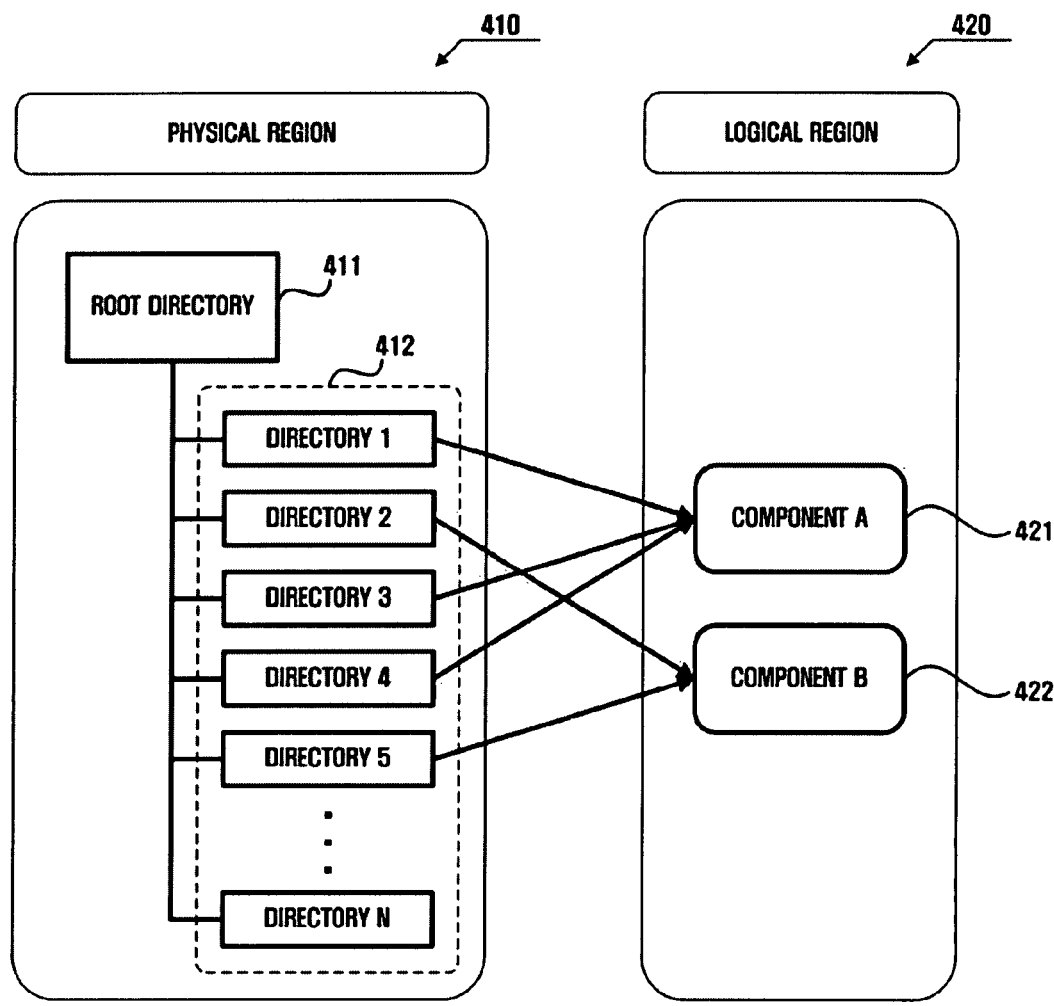
FIG. 4 is a diagram illustrating a case where components are constructed by a combination of component unit directories, according to an exemplary embodiment of the present invention.

FIG. 4 is a diagram illustrating a case where components are constructed by a combination of component unit directories according to an exemplary embodiment of the present invention. FIG. 4 shows a legacy system existing in a physical region 410 and components 421 and 422 generated in a logical region 20 according to an exemplary embodiment of the present invention.

As shown in FIG. 4, the legacy system may include a root directory 411 and lower component unit directories 412. One component may be generated by a combination of one or more component unit directories 412. In FIG. 4, a component A 421 is generated by using component unit directories 1, 3, and 4, and a component B 422 is generated by using component unit directories 2 and 5.

As the components are generated, the primitive component generating section 221 generates function level data, build level data, and interface data. FIGS. 5A and 5B show function level data 510 and 530 and interface data 520 and 540 with respect to the component A 421 and the component B 422, respectively.

FIG. 5A shows the function level data 510 and the interface data 520 with respect to the component A 421. The function level data 510 represents that an interface I_A named ipI_A is included. The interface data 520 represents that the interface I_A is defined by symbols or header files of the component unit directories 1, 3, and 4.

FIG. 5B shows the function level data 530 and the interface data 540 with respect to the component B 422. The function level data 530 represents that an interface I_B named ipI_B is included. The interface data 540 represents that the interface I_B is defined by symbols or header files of the component unit directories 2 and 5.

Figure 6:
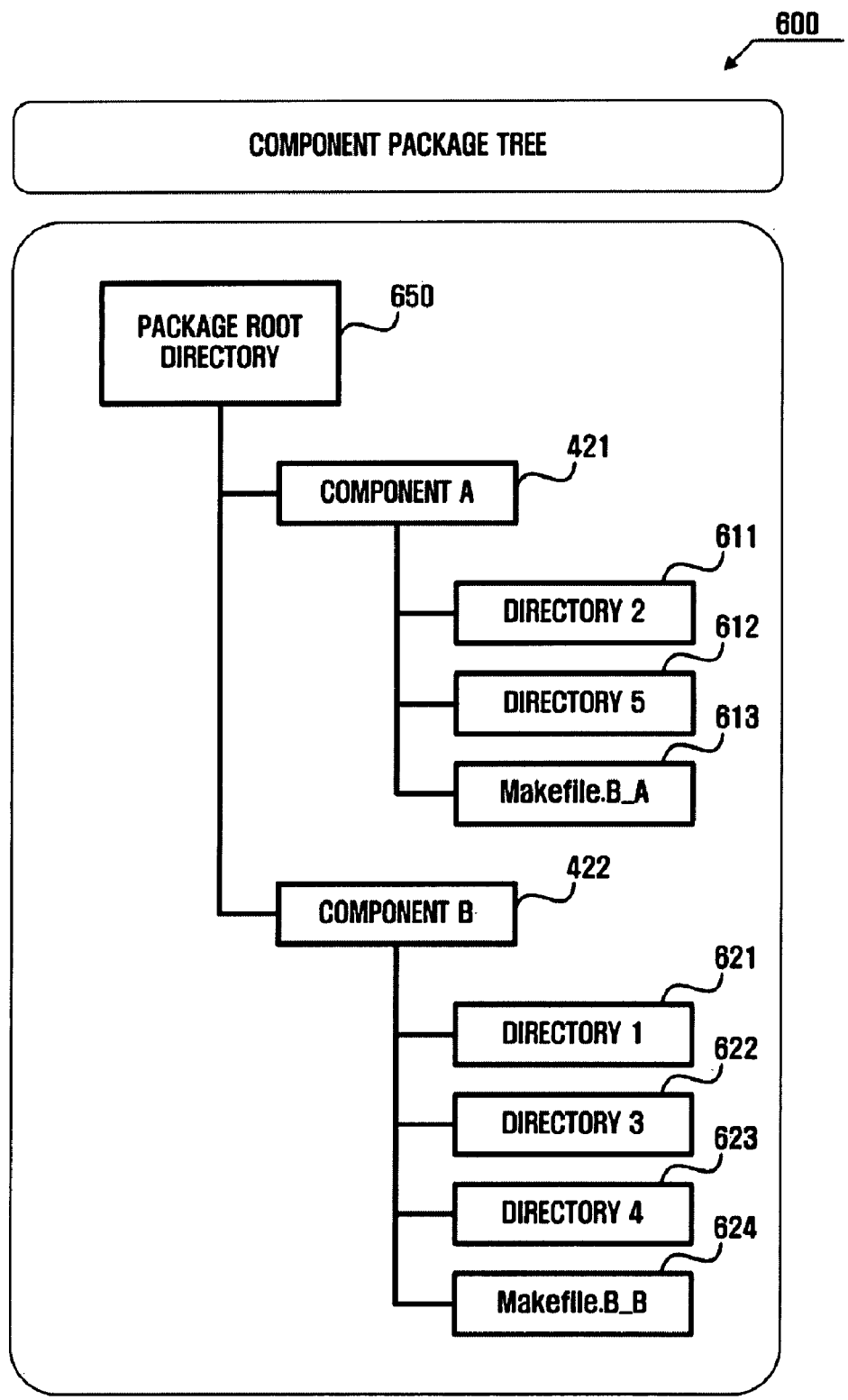
FIG. 6 is a diagram illustrating a component package tree with respect to a legacy system according to an exemplary embodiment of the present invention.

The components generated by the component generating unit 220 are parts of a component package that constitutes the entire system. FIG. 6 is a diagram illustrating a component package tree 600 with respect to a legacy system according to an exemplary embodiment of the present invention. That is, FIG. 6 shows the components A and B 421 and 422 shown in FIG. 4 exist as the parts of the component package.

The component package tree 600 includes a package root directory and components. The package root directory 650 includes all of the components constituting the entire system. Here, the components include primitive components and composite components. Specifically, the package root directory means a composite component that includes all the components.

As shown in FIG. 6, the components 421 and 422 include build files 613 and 624 as well as component unit directories 611, 612, 621, 622, and 623. When the entire system is being built, the building results according to the components are individually provided in the components.

FIGS. 7A and 7B are diagrams illustrating build level data and a source code list, respectively, with respect to a component A among the components shown in FIG. 6. As shown in FIG. 7A, build level data 710 includes "properties" and "provides" syntaxes.

As shown in FIG. 7A, the "properties" syntax of the build level data 710 includes a version of a component, an ID of a source code, a build type, a name of a build file, and a source code list. The "provides" syntax includes a library that is generated as a result of the building of the component.

Further, a source code list 720 of FIG. 7B includes a list of the header files and a list of the source files of the component unit directories, and a name of a build file.

Figure 8:
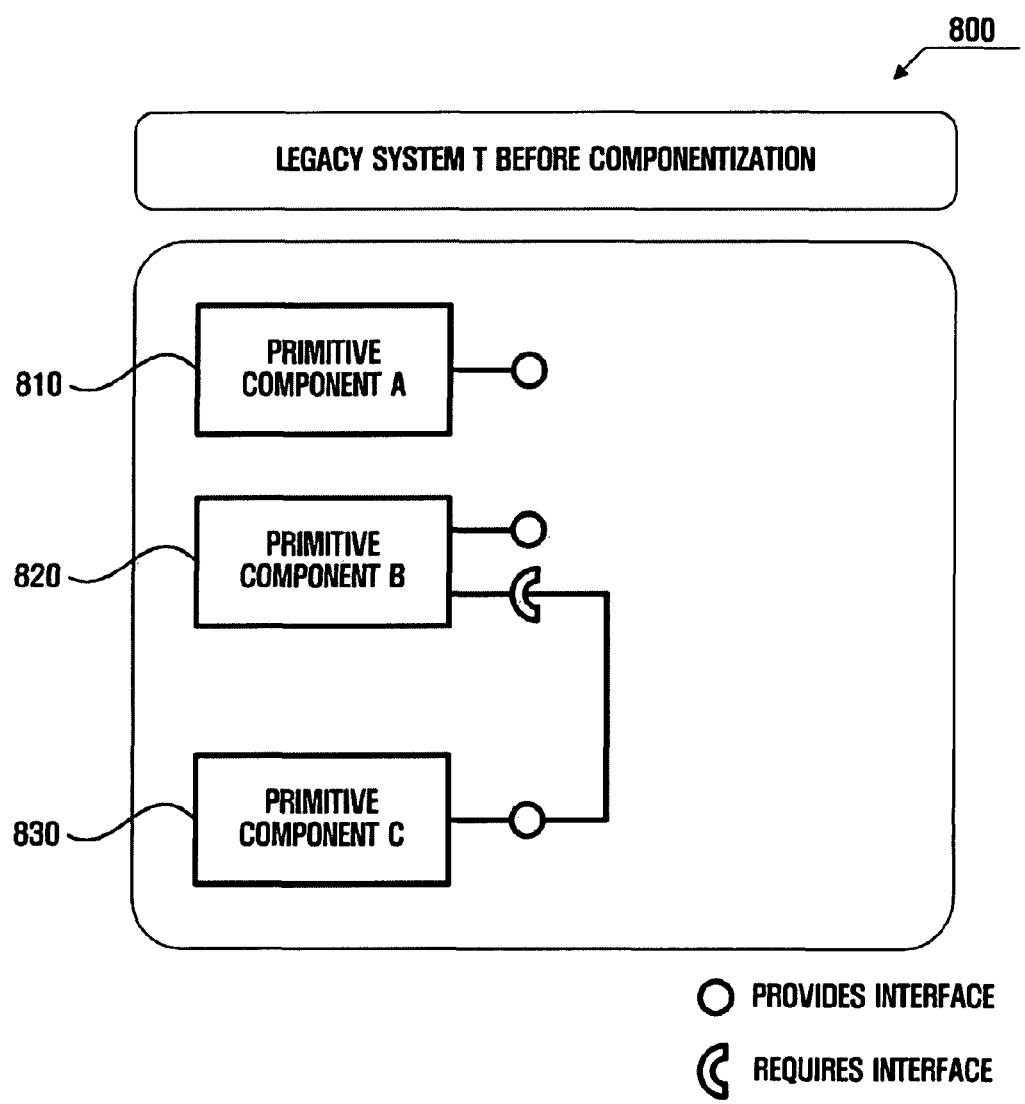
FIG. 8 is an exemplary view illustrating a legacy system before componentization is performed, according to an exemplary embodiment of the present invention.

FIG. 8 is an exemplary view illustrating a legacy system before componentization is performed, according to an exemplary embodiment of the present invention. As shown in FIG. 8, a legacy system 800 includes components A, B, and C 810, 820, and 830, and a "requires" interface by the component B 820 is connected to a "provides" interface by the component C 830.

Figure 9:
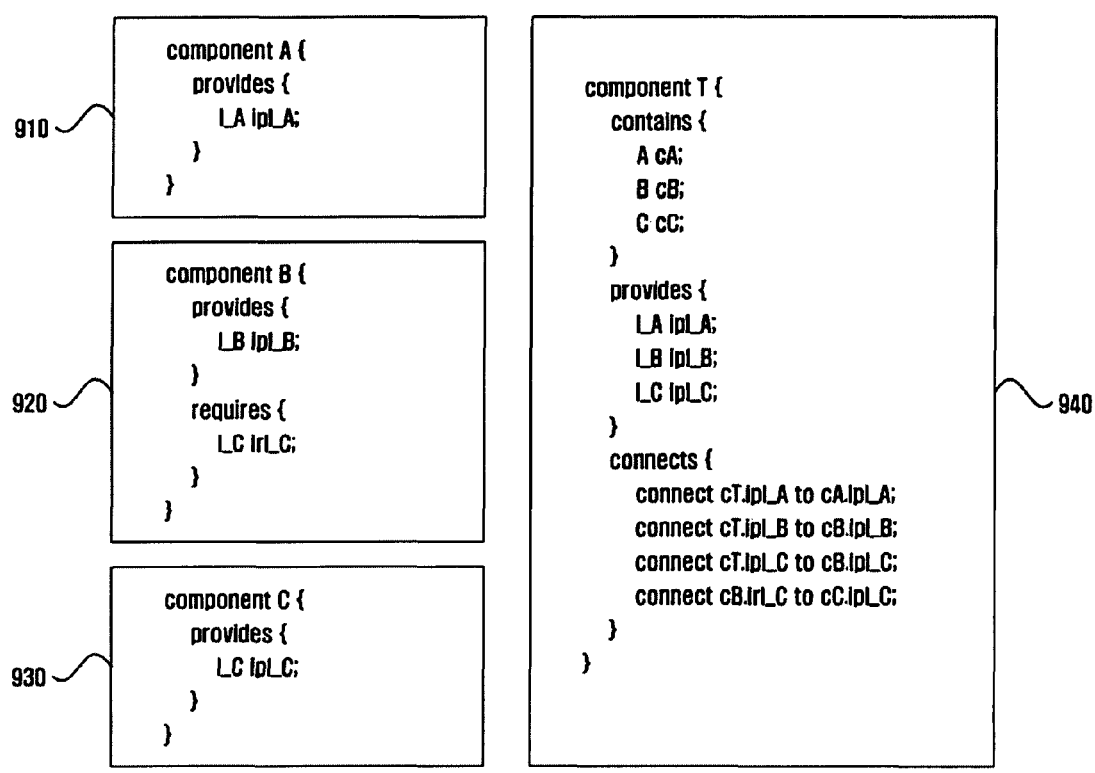
FIG. 9 is a diagram illustrating function level data with respect to components, which are included in the legacy system of FIG. 8.

FIG. 9 is a diagram illustrating the components 810, 820, and 830 included in the legacy system of FIG. 8 and function level data 910, 920, 930, and 940 with respect to the components of the entire legacy system.

As shown in FIG. 9, the "provides" syntax defines that a "provides" interface I_A named ipI_A is included in the function level data 910 with respect to the component A 810, that a "provides" interface I_B named an ipI_B is included in the function level data 920 with respect to the component B 820, and that a "provides" interface I_C named ipI_C is included in the function level data 930 with respect to the component C 830.

Here, the "requires" syntax defines that a "provides" interface I_C, named irI_C, of the component C 830 is included in the function level data 920 of the component B 820.

A component T is a component with respect to the entire legacy system, that is, a composite component. The "contains" syntax represents that components A, B, and C, which are named cA, cB, and cC, respectively, are included in the function level data 940 of the component T as lower components. The "provides" syntax represents that "provides" interfaces I_A, I_B, and I_C, which are named ipI_A, ipI_B, and ipI_C, respectively, are included therein. The "connects" syntax represents the association between the components A, B, C, and T.

From the association between the components according to the "connects" syntax, it can be seen that the "provides" interfaces ipI_A, ipI_B, and ipI_C, which are included in the component T, are connected to the "provides" interfaces ipI_A, ipI_B, and ipI_C of the components A, B, and C, and the "requires" component irI_C, which is included in the component B, is connected to the "provides" interface ipI_C of the component C.

Figure 10:
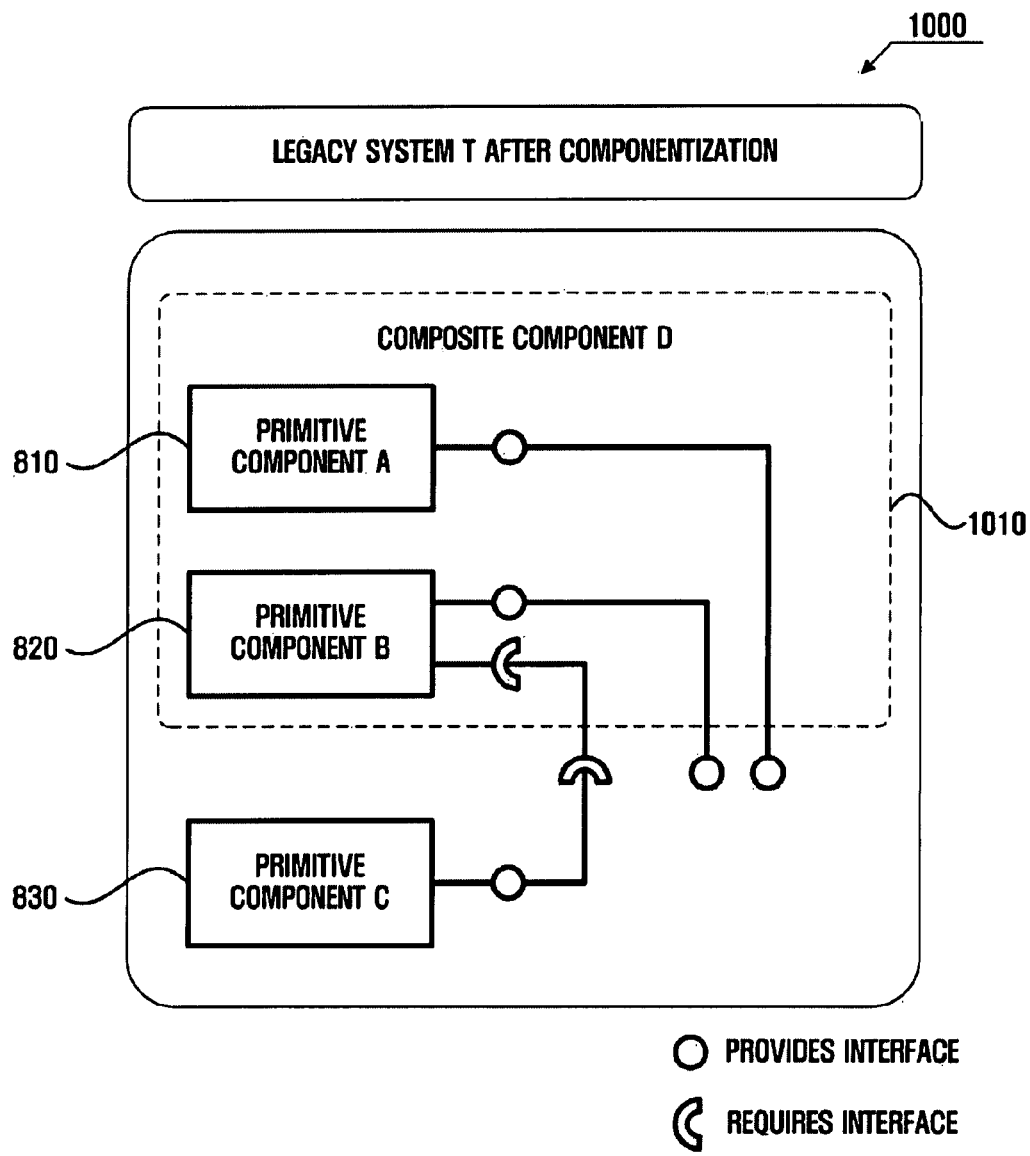
FIG. 10 is a diagram illustrating a system after componentization is performed according to an exemplary embodiment of the present invention.

FIG. 10 is a diagram illustrating a system after componentization is performed, according to an exemplary embodiment of the present invention. FIG. 10 shows a system 1000 in which the components A and B 810 and 820, which are included in the legacy system 800 of FIG. 8, are reconstructed as a component D 1010.

That is, in FIG. 10, as the components A and B 810 and 820 are reconstructed as the component D 1010, the "provides" interfaces included in the components A and B 810 and 820 are included in the component D 1010, and the "requires" interface included in the component B 820 is included to the component D 1010.

Figure 11:
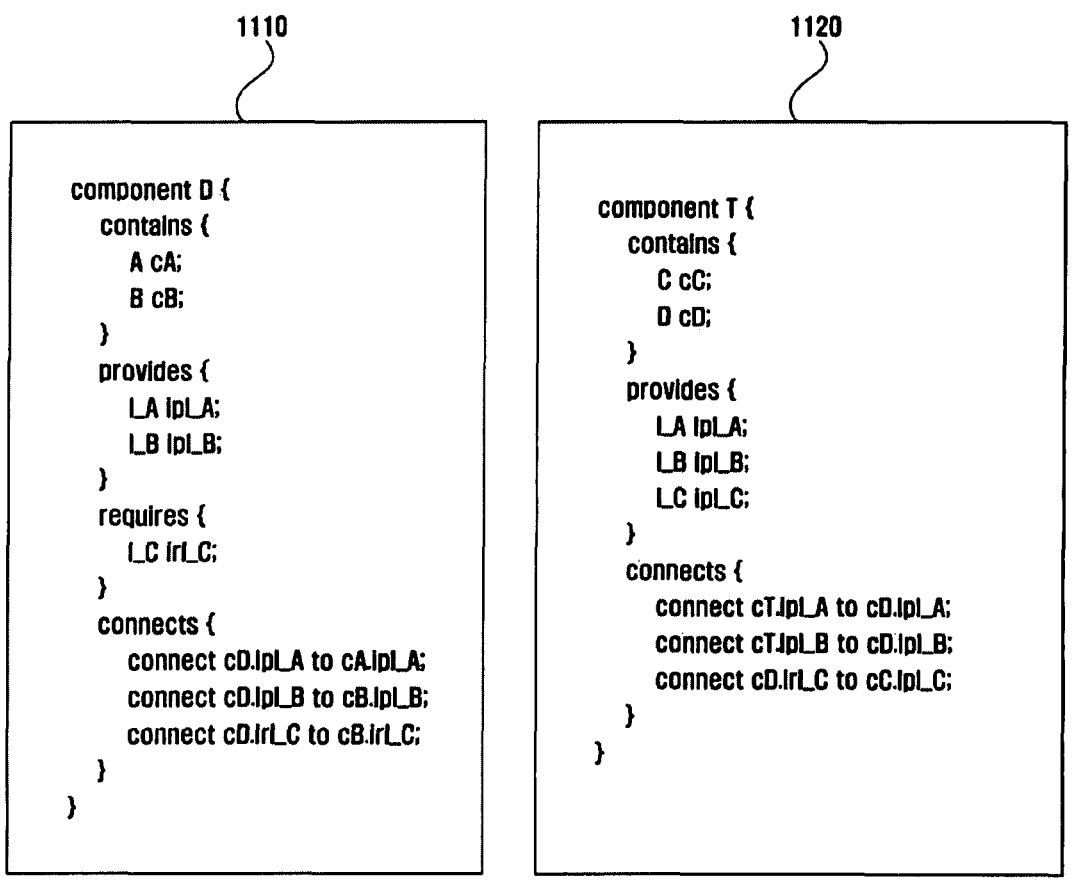
FIG. 11 is a diagram illustrating function level data with respect to components, which are included in the system of FIG. 10.

FIG. 11 is a diagram illustrating function level data 1110 and 1120 of components that are included in the reconstructed system of FIG. 10.

As shown in FIG. 11, the component D 1010 is a composite component that includes the primitive components A and B 810 and 820. The "contains" syntax defines that the components A and B named cA and cB are included in the function level data 1110 of the component D 1010 as lower components. The "provides" syntax defines that the "provides" interfaces I_A and I_B named ipI_A and ipI_B are included therein. The "requires" syntax defines that the "requires" interface I_C named irI_C named is included therein. The "connects" syntax defines the association between the components A, B, and D.

From the association between the components according to the "connects" syntax, it can be seen that the "provides" interfaces ipI_A and ipI_B included in the component D are connected to the "provides" interfaces ipI_A and ipI_B of the components A and B, respectively, and the "requires" interface irI_C of the component D is connected to the "requires" interface irI_C of the component B.

Further, the "contains" syntax defines that components C and D named cC and cD are included in the function level data 1120 of the component T as lower components with respect to the entire system. The "provides" syntax represents that the "provides" interfaces I_A, I_B, and I_C named ipI_A, ipI_B, and ipI_C are included therein. The "connects" syntax represents the association between the components C, D, and T.

From the association between the components according to the "connects" syntax, it can be seen that the "provides" interfaces ipI_A and ipI_B included in the component T are connected to the "provides" interfaces ipI_A and ipI_B of the components A and B, respectively, and the "requires" interface irI_C included in the component D is connected to the "provides" interface ipI_C of the component C.

Figure 12:
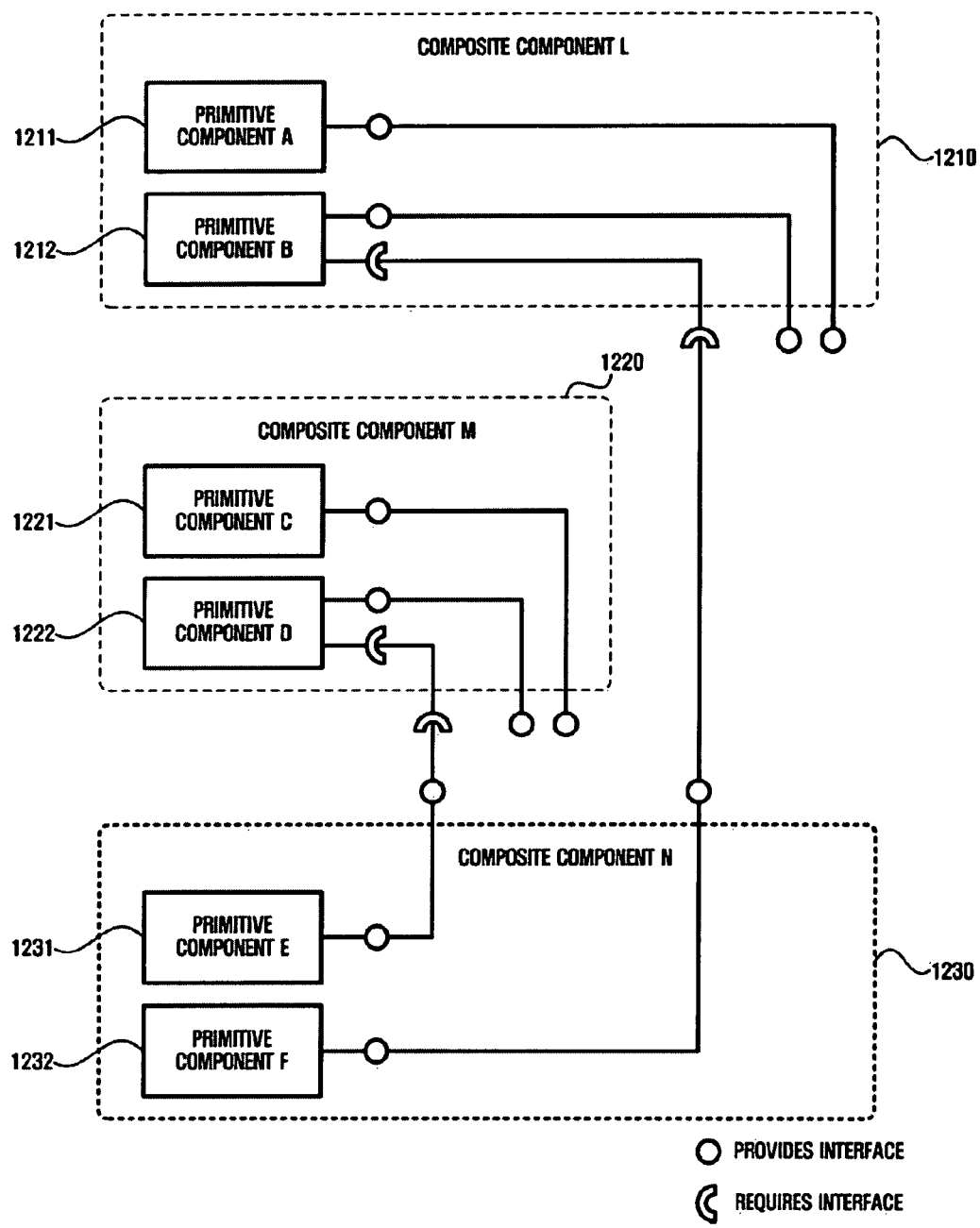
FIG. 12 is a diagram illustrating the association between a new composite component that is generated and an existing composite component, according to the exemplary embodiment of the present invention.

FIG. 12 is a diagram illustrating the association between a new composite component that is generated and an existing composite component according to the exemplary embodiment of the present invention. In FIG. 12, among primitive components A, B, C, D, E, and F 1211, 1212, 1221, 1222, 1231, and 1232, when the primitive components A and B 1211 and 1212 are included in a composite component L 1210, and the primitive components C and D 1221 and 1222 are included in a composite component M 1220, the primitive components E and F 1231 and 1232 are included in a newly generated composite component N 1230.

As shown in FIG. 12, the composite component L 1210 includes "provides" interfaces by the primitive components A and B 1211 and 1212 and a "requires" interface by the primitive component B 1212, and the composite component M 1220 includes "provides" interfaces by the primitive components C and D 1221 and 1222 and a "requires" interface by the primitive component D 1222.

Here, the "requires" interfaces by the composite components L and M 1210 and 1220 are connected to the primitive components F and E 1232 and 1231, respectively.

FIG. 13 is a diagram illustrating function level data with respect to the composite components shown in FIG. 12. FIG. 13 is a diagram illustrating function level data 1310 and function level data 1320 before and after componentization of the entire system T as a composite component.

The "contains" syntax defines that components L, M, E, and F named cL, cM, cE, and cF, respectively, are included in the function level data 1310 as lower components before componentization of the system as the composite component. The "provides" syntax defines that "provides" interface I_A, I_B, I_C, I_D, I_E, and I_F named ipI_A, ipI_B, ipI_C, ipI_D, ipI_E, and ipI_F, respectively, are included therein. The "connects" syntax defines the association between the components L, M, E, F, and T.

From the association between the components according to the "connects" syntax, it can be seen that "provides" interfaces ipI_A, ipI_B, ipI_C, ipI_D, ipI_E, and ipI_F included in the component T are connected to the "provides" interfaces ipI_A, ipI_B, ipI_C, ipI_D, ipI_E, and ipI_F that are included in the components L, M, E, and F, respectively. The "requires" interfaces irI_F and irI_E, which are included the components F and E, respectively, are connected to the "provides" interfaces ipI_F and ipI_E that are included in the components F and E, respectively.

Meanwhile, the "contains" syntax defines that the components L, M, and N named cL, cM, and cN are included in the function level data 1320 as lower components after componentization of the system as the composite component. The "provides" syntax defines that the "provides" interfaces I_A, I_B, I_C, I_D, I_E, and I_F named ipI_A, ipI_B, ipI_C, ipI_D, ipI_E, and ipI_F are included therein. The "connects" syntax defines the association between the components L, M, N, and T.

From the association between the components according to the "connects" syntax, it can be seen that the "provides" interfaces ipI_A, ipI_B, ipI_C, ipI_D, ipI_E, and ipI_F included in the component T are connected to the "provides" interfaces ipI_A, ipI_B, ipI_C, ipI_D, ipI_E, and ipI_F, respectively, which are included in the components L, M, and N. Further, the "requires" interfaces irI_F and irI_E included in the components L and M are connected to the "provides" interfaces ipI_F and ipI_E, respectively, which are included in the component N.

Figure 14:
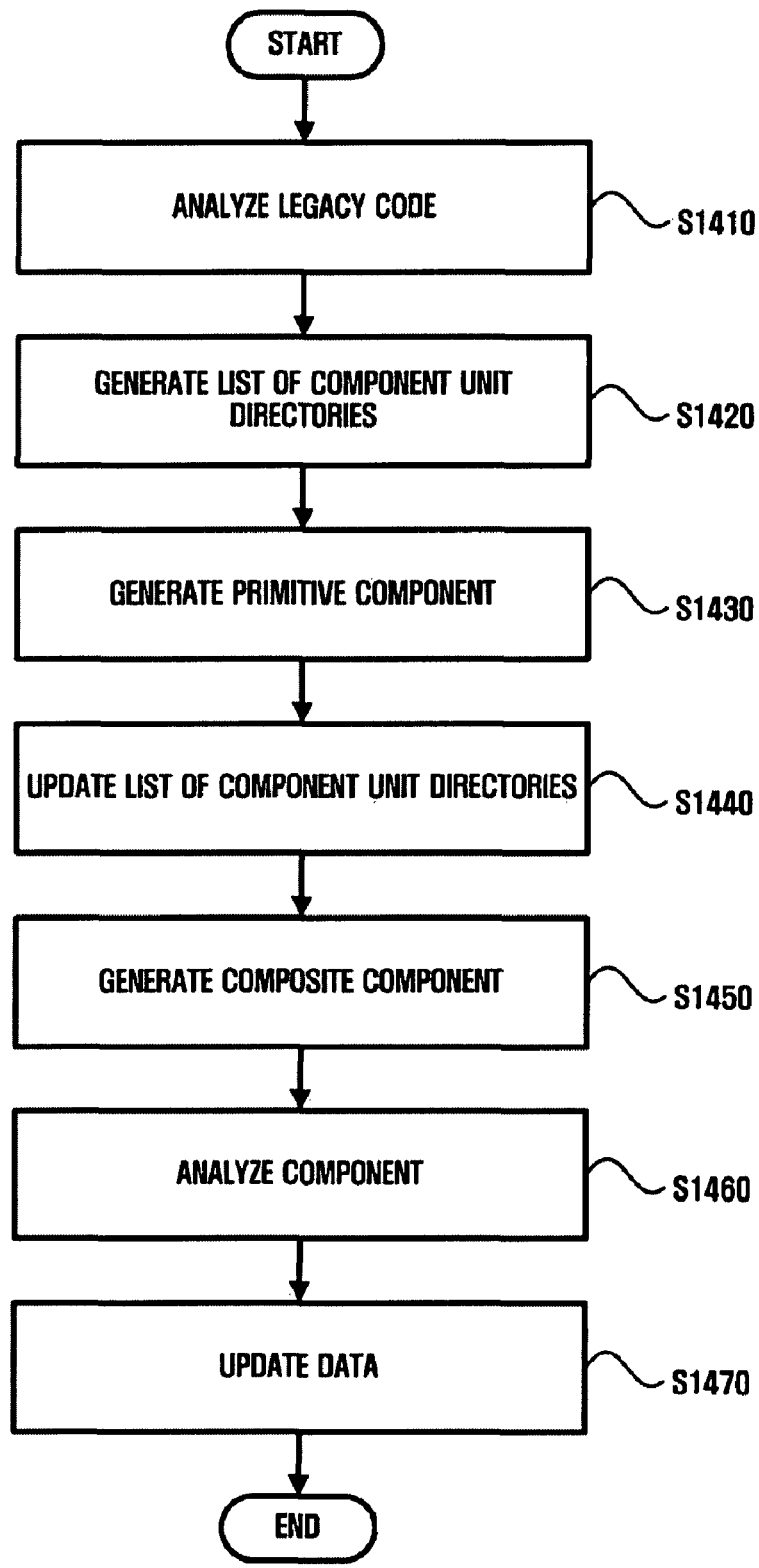
FIG. 14 is a flowchart illustrating a process of componentizing a legacy system according to an exemplary embodiment of the present invention.

FIG. 14 is a flowchart illustrating a process of componentizing a legacy system according to an exemplary embodiment of the present invention.

In order to componentize the legacy system, the legacy code analyzing unit 210 of the component apparatus 200 analyzes the association between one or more legacy codes, which are included in the legacy system (S1410). That is, the legacy code analyzing unit 210 analyzes the association between the legacy codes by using at least one of header file reference information, function call information, and symbol reference information, all of which are included in the legacy codes.

After the analysis of the association between the legacy codes is completed, the legacy code analyzing unit 210 generates a list of component unit directories (S1420).

Further, the legacy code analyzing unit 210 may perform analysis according to a prescribed analysis range, which will be described below in detail with reference to FIG. 15.

The primitive component generating section 221 generates a primitive component (S1430). That is, the primitive component generating section 221 generates data for defining one or more components by referring to the analyzed association. Here, the generated data may include function level data, build level data, and interface data.

Then, when the primitive component is completely generated, the component managing section 222 updates the list of component unit directories (S1440), and the composite component generating section 223 generates a composite component (S1450). Here, the composite component may include only a primitive component, or may include an additional composite component.

After the primitive component and the composite component are generated, a control command indicating that the primitive and composite components are generated is transmitted to the component analyzing unit 250. The component analyzing unit 250 analyzes the association between the components by using the generated data (S1460).

The analysis result by the component analyzing unit 250 is transmitted to the data updating unit 260, and the data updating unit 260 updates data stored in the storage unit 240 by using the transmitted data (S1470).

Figure 15:
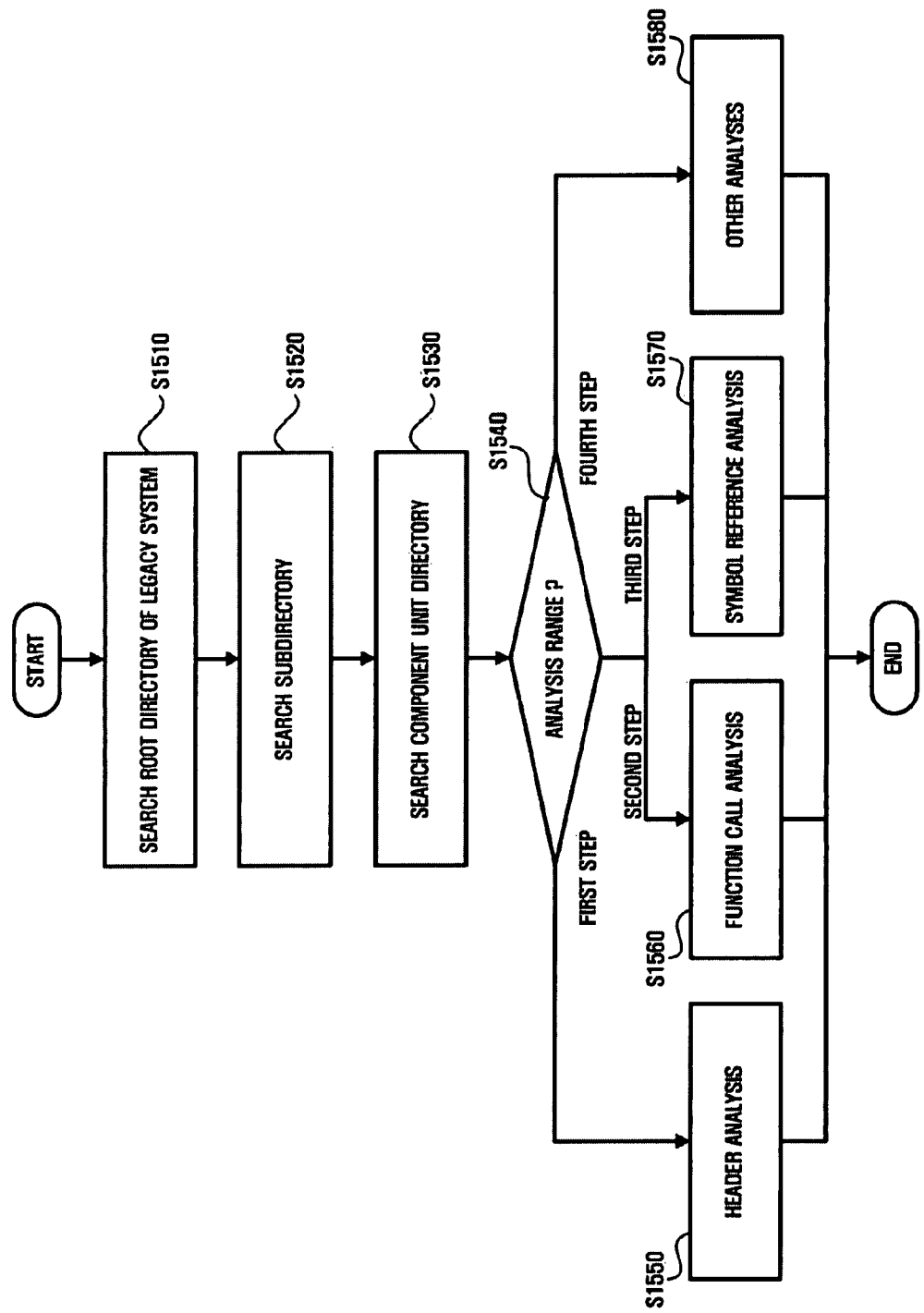
FIG. 15 is a flowchart illustrating a process of analyzing a legacy code according to an exemplary embodiment of the present invention.

FIG. 15 is a flowchart illustrating a process of analyzing a legacy code according to an exemplary embodiment of the present invention.

In order to analyze the legacy code, the legacy code analyzing unit 210 searches for a root directory of the legacy system (S5110).

After the search of the root directory is completed, the legacy code analyzing unit 210 searches for subdirectories (S1520). Meanwhile, the subdirectories may be divided into directories included in the component and directories not included in the component. The legacy code analyzing unit 210 searches for directories that are included in the component, that is, the component unit directories (S1530).

Next, the legacy code analyzing unit 210 checks a prescribed analysis range (S1540). Here, the analysis range may be input by the developer or previously stored in the storage unit 240.

According to the prescribed analysis range, the legacy code analyzing unit 210 selectively performs a header analysis (S1550), a function call analysis (S1560), a symbol reference analysis (S1570), and other analyses (S1580). Here, other analyses (S1580) are performed to analyze residual codes, excluding the headers, function calls, and symbol reference, and may include an analysis of a syntax including a specified instruction. The specified instruction may be input by the developer.

Meanwhile, in FIG. 15, although one analysis process has been performed according to the analysis range, two or more analysis processes may be sequentially performed. For example, when the analysis range includes two operations, the header analysis (S1550) and the function call analysis (S1560) may be sequentially performed. When the analysis range includes four operations, the header analysis (S1550), the function call analysis (S1560), the symbol reference analysis (S1570), and other analyses (S1580) may be sequentially performed.

Figure 16:
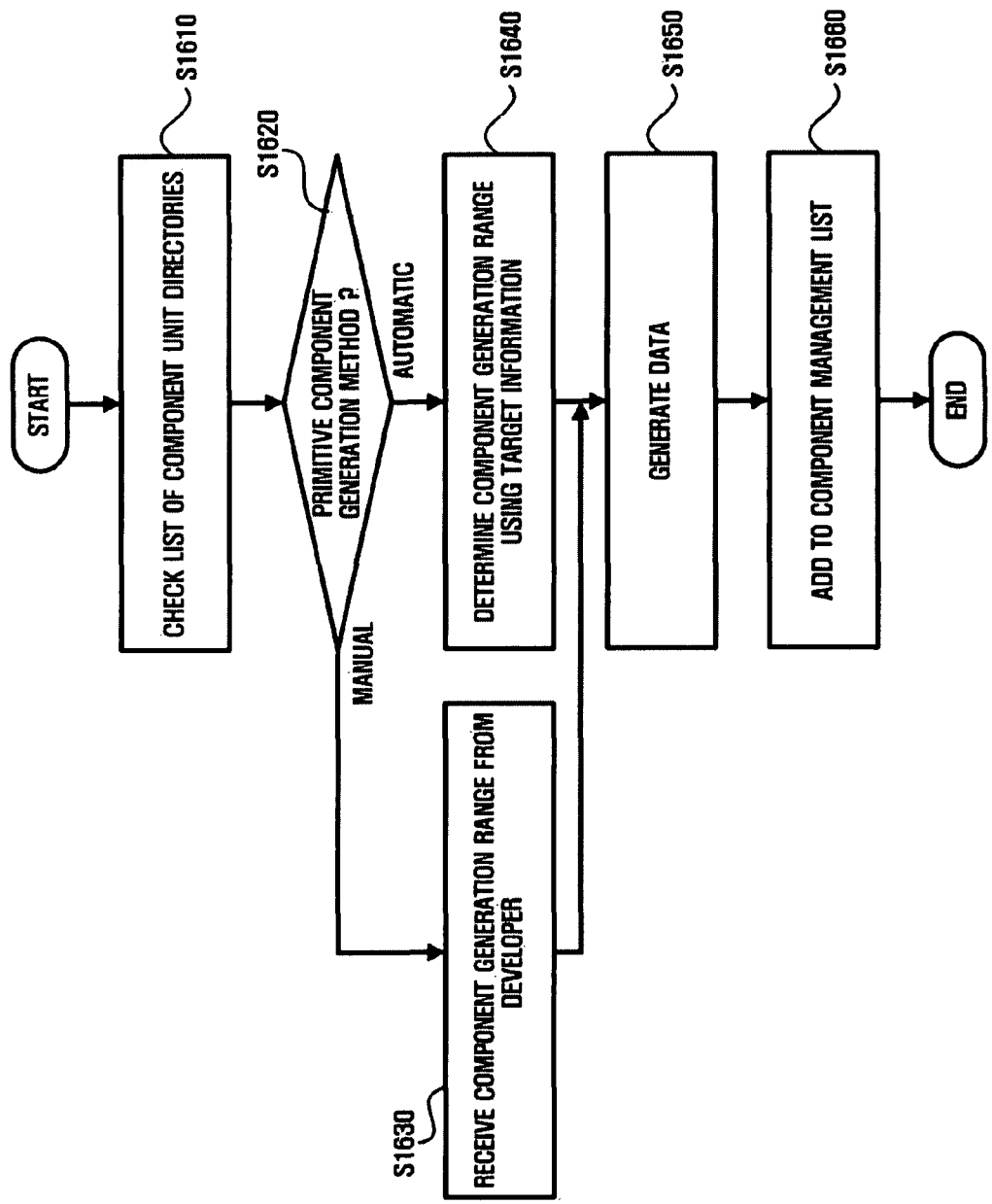
FIG. 16 is a flowchart illustrating a process of generating a primitive component according to an exemplary embodiment of the present invention.

FIG. 16 is a flowchart illustrating a process of generating a primitive component according to an exemplary embodiment of the present invention.

In order to generate a primitive component, the primitive component generating section 221 first checks a list of component unit directories (S1610). The primitive component generating section 221 checks whether a method of generating a primitive component is manually or automatically performed (S1620).

When the method of generating the component is manually performed, a component generation range is received from the developer (S1630). That is, the developer may select some component unit directories to be included in one primitive component among the component unit directories and input the selected component unit directories.

Meanwhile, when the method of generating the component is automatically performed, the primitive component generating section 221 determines the component generation range using target information existing in the legacy system (S1640). For example, the primitive component generating section 221 determines the component generation range using reference information, such as header files or source files.

When the component generation range, that is, the list of component unit directories to be included in the primitive component, is selected, the primitive component generating section 221 generates a primitive component. That is, the primitive component generating section 221 generates function level data, build level data, and interface data (S1650).

Then, the primitive component generating section 221 incorporates component data, function level data, build level data, and interface data, which are included in the component unit directories, into one package, and adds the package to a component management list (S1660).

Figure 17:
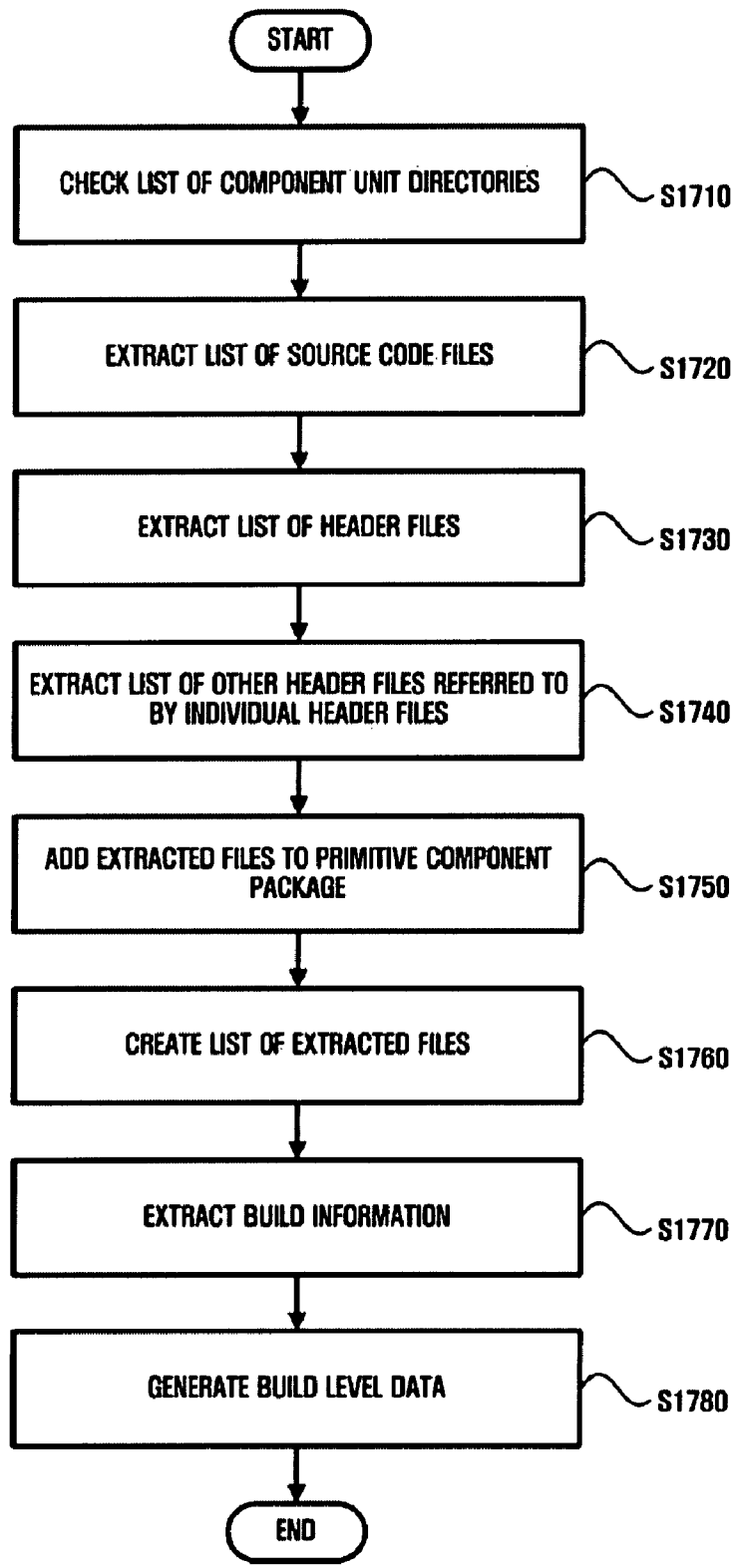
FIG. 17 is a flowchart illustrating a process of generating build level data according to an exemplary embodiment of the present invention.

FIG. 17 is a flowchart illustrating a process of generating build level data according to an exemplary embodiment of the present invention.

In order to generate the build level data, the primitive component generating section 221 first checks a list of component unit directories (S1710). The primitive component generating section 221 extracts a list of source code files that are included in the corresponding component unit directories (S1720), a list of header files (S1730), and a list of other header files that are referred to by the individual header files (Step S11740).

When the list of header files is extracted, the files existing in the primitive component may be excluded from a target to be extracted.

The primitive component generating section 221 adds the extracted files to the package of the primitive components (S1750). That is, a physical storage path is changed from a storage position in the legacy system to a storage position of the component package.

Further, the primitive component generating section 221 creates a list of extracted files (S1760), and extracts build information (S1770). The build information may be extracted by referring to information that is prescribed in the legacy system. The build information may include a version of the component, an ID of a source code, a build type, a name of a build file, a position of the build file, and a list of source codes.

Then, the primitive component generating section 221 generates build level data that includes the extracted build information (S1780).

Figure 18:
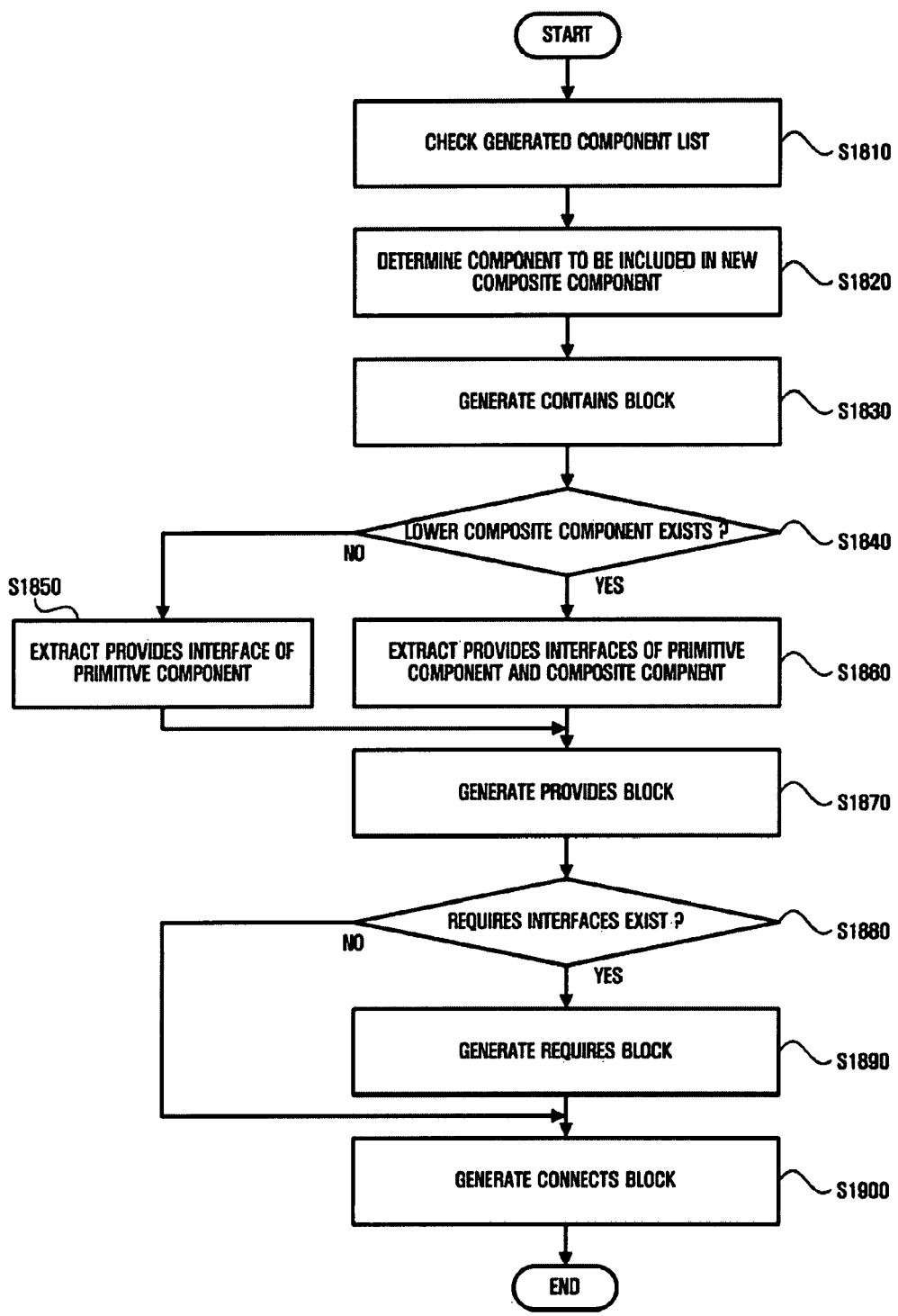
FIG. 18 is a flowchart illustrating a process of generating a composite component according to an exemplary embodiment of the present invention.

FIG. 18 is a flowchart illustrating a process of generating a composite component according to an exemplary embodiment of the present invention.

In order to generate the composite component, the composite component generating section 223 checks a list of generated components by referring to the component management list that is stored in the storage unit 240 (S1810).

Next, the composite component generating section 223 determines the components that are to be included in a new composite component (SI820). Here, the components that are to be included in the new composite component include primitive components and an additional composite component.

Further, the composite component generating section 223 generates "contains" blocks of function level data and build level data (S1830). At this time, the composite component generating section 223 checks whether or not a lower composite component exists (S1840). When the lower composite component does not exist, the composite component generating section 223 extracts a "provides" interface of the primitive component (S1850). If the lower composite component exists, the composite component generating section 223 extracts "provides" interfaces of the primitive component and the lower composite component (S1860).

The composite component generating section 223 generates a "provides" block (S1870) and adds the extracted provides interfaces.

Further, the composite component generating section 223 checks whether a "requires" interface exists in the components included in the composite component (S1880) and, when the "requires" interface exists, generates a "requires" block and adds the "requires" interface (S1890).

Finally, the composite component generating section 223 generates a "connects" block (S1900) and adds the association between the components included in the composite component, thereby completing the generation of the composite component.

Figure 19:
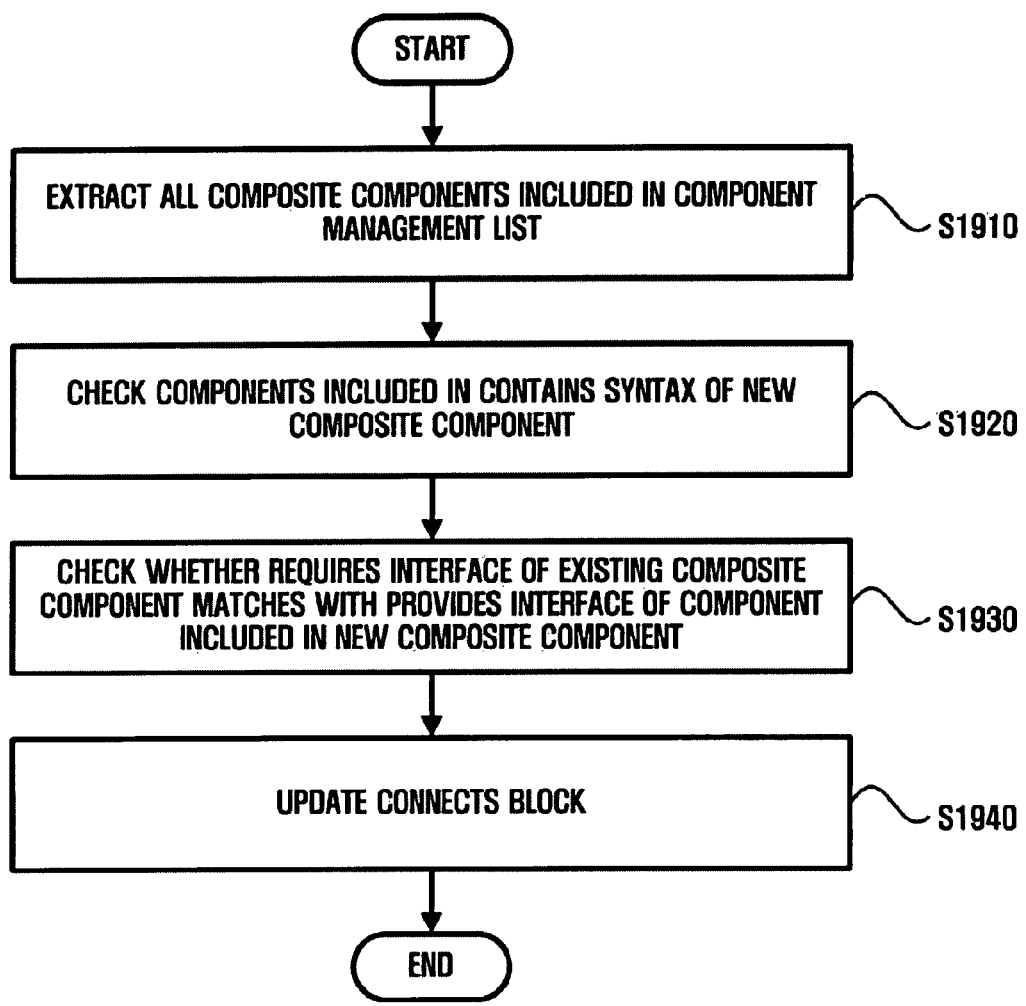
FIG. 19 is a flowchart illustrating a process of updating data according to an exemplary embodiment of the present invention.

FIG. 19 is a flowchart illustrating a process of updating data according to an exemplary embodiment of the present invention.

In order to update the data, the component analyzing unit 250 extracts all of the composite components that are included in the component management list (S1910).

Next, the component analyzing unit 250 checks which components are included in the "contains" syntax of the new composite component (S1920).

The component analyzing unit 250 checks whether the "requires" interface of the existing composite component coincides with the "provides" interface of the component included in the new composite component (S1930). At this time, when the additional composite component exists in the existing composite component, it may be checked whether or not a "requires" interface of the additional composite component matches with the "provides" interface of the component included in the new composite component.

If the two interfaces match with each other, the data updating unit 260 updates the "connects" block while considering the check result (S1940). Referring to FIG. 13, two "connects" syntaxes located at a lower portion of the function level data 1320 may be referred to.

That is, since the "requires" interfaces irI_F and irI_E of the components L and M of the existing composite component are connected to the "provides" interfaces ipI_F and ipI_E, respectively, included in the components F and E, the "requires" interfaces irI_F and irI_E, which are included in the existing composite component, are connected to the "provides" interfaces ipI_F and ipI_E included in the new composite component.

Figure 20:
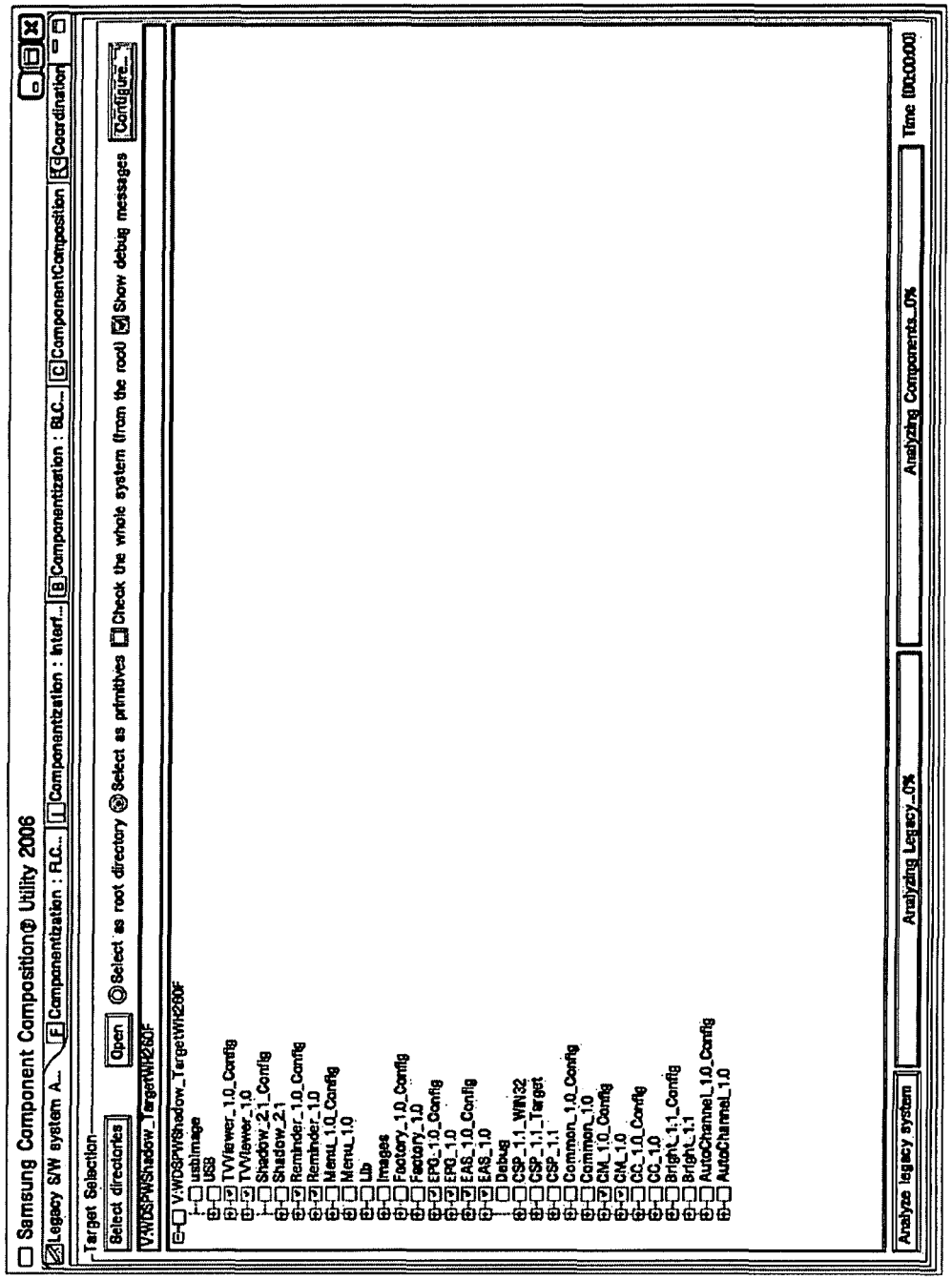
FIG. 20 is a view illustrating a case where component unit directories are selected, according to an exemplary embodiment of the present invention.

FIG. 20 is a diagram illustrating a case where component unit directories are selected, according to an exemplary embodiment of the present invention.

The method of generating a primitive component may be manually or automatically performed. When the generation method is set to be manually performed, the developer may directly select component unit directories to be included in the primitive component.

FIG. 20 shows a graphic user interface on which a developer selects check boxes to thereby select predetermined component unit directories.

Meanwhile, when the method of generating a primitive component is automatically performed, as shown in FIG. 20, the component unit directories selected using the check boxes may be displayed on the graphic user interface. At this time, the developer may modify the selection of the check boxes to add or exclude a specified component unit directory, such that the primitive component is generated.

Figure 21:
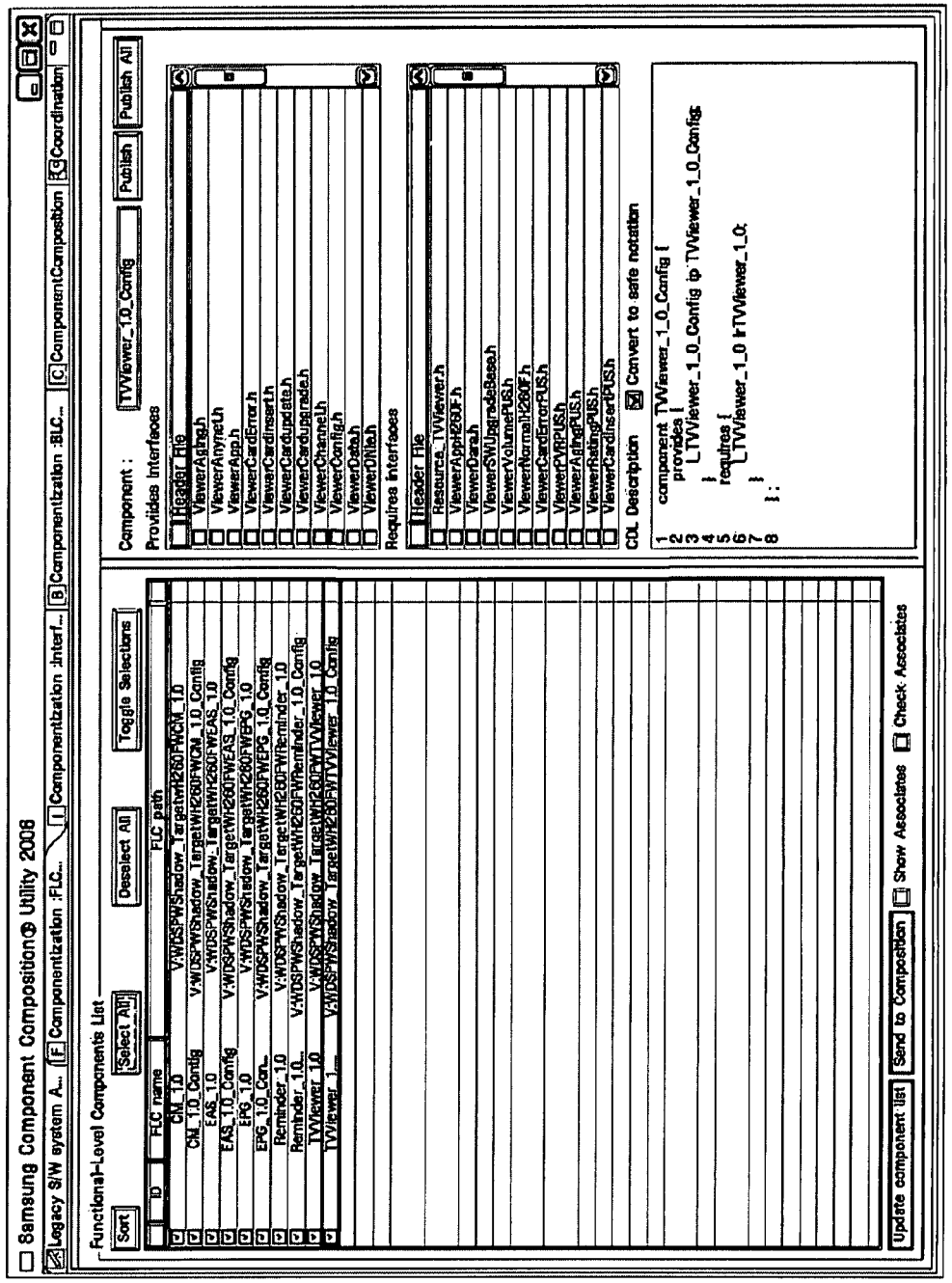
FIG. 21 is a diagram illustrating function level data with respect to analyzed component unit directories according to an exemplary embodiment of the present invention.

FIG. 21 is a diagram illustrating function level data with respect to analyzed component unit directories according to an exemplary embodiment of the present invention. FIG. 21 shows a graphic user interface in which a "provides" interface I_TVViewer__1__0_Config named ipTViewer__1__0_Config and a "requires" interface I_TVViewer__1__0 named irTVViewer__1__0 are included in function level data of a component TViewer__1__0_Config.

With the graphic user interface of FIG. 21, the developer may select a directory of the components that are constructed by at least one component unit directory, that is, a unit directory, thereby checking a list of header files included in the corresponding unit directory and a list of header files to be referred to.

Figure 22:
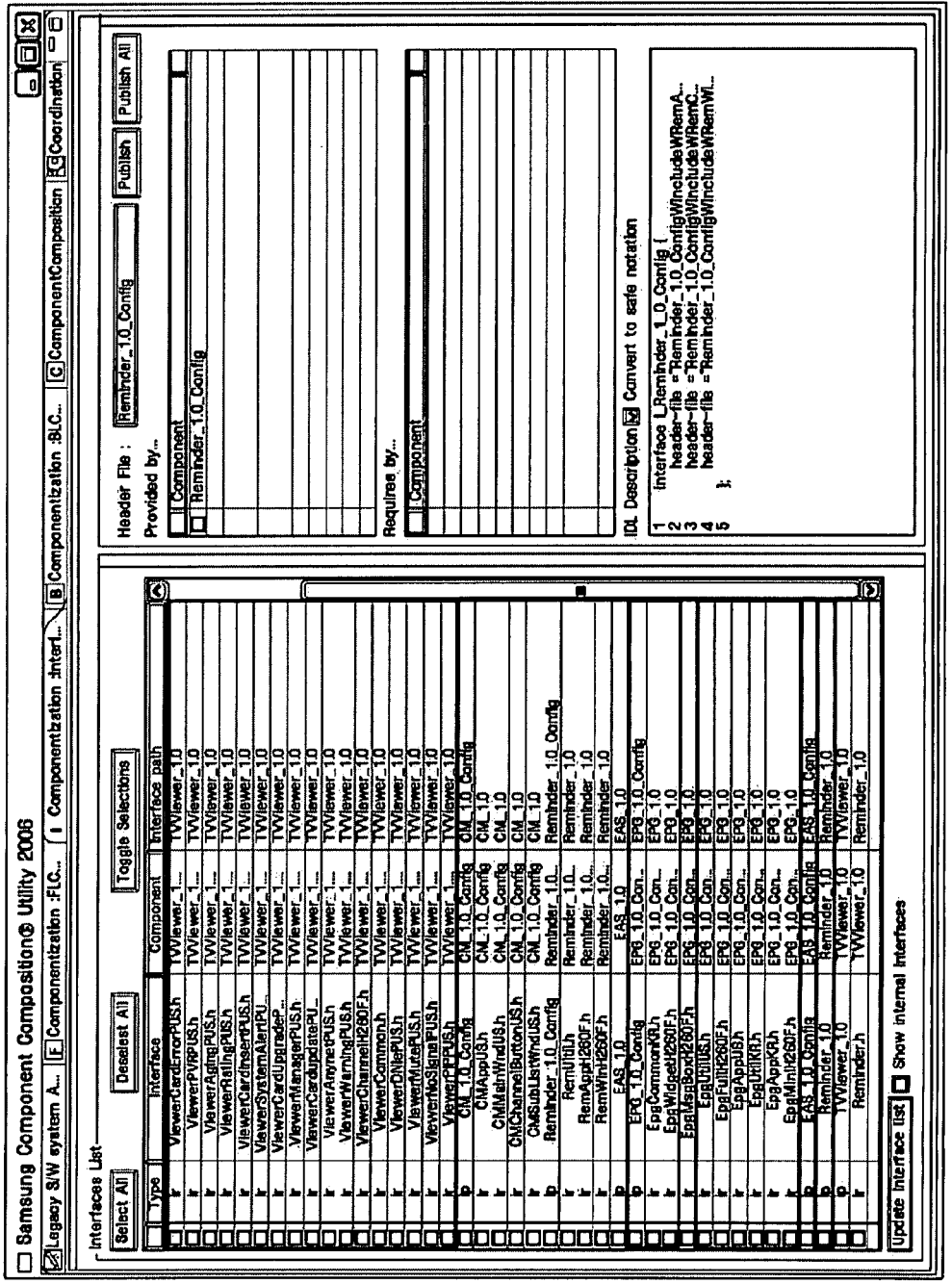
FIG. 22 is a diagram illustrating interface data with respect to analyzed component unit directories according to an exemplary embodiment of the present invention.

FIG. 22 is a diagram illustrating interface data with respect to analyzed component unit directories according to an exemplary embodiment of the present invention. FIG. 22 shows a graphic user interface in which a plurality of interfaces are included in an interface I_Reminder__1__1__0_Config of a component Reminder__1.0_Config.

Figure 23:
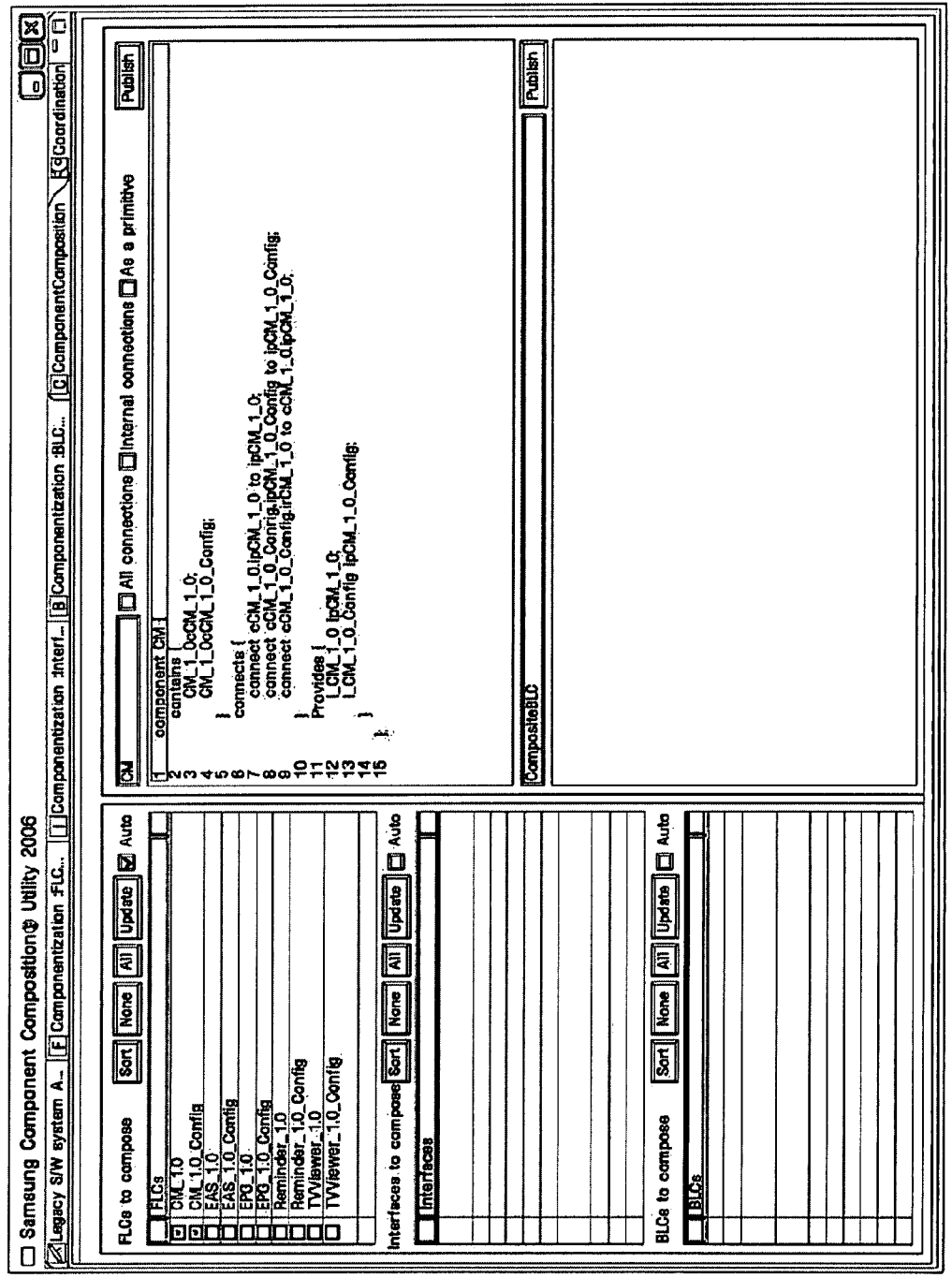
FIG. 23 is a diagram illustrating a composite component, which is generated by a combination of primitive components, according to an exemplary embodiment of the present invention.

FIG. 23 is a diagram illustrating a composite component, which is generated by a combination of primitive components, according to an exemplary embodiment of the present invention. In FIG. 23, function level data with respect to a composite component CM including primitive components CM__1.0 and CM__1.0_Config is displayed on the graphic user interface.

The function level data shown in FIG. 23 allows the developer to recognize that "provides" interfaces ipCM_1_0 and ipCM_1_0_Config included in the primitive components CM_1.0 and CM_1.0_Config, respectively, are connected to "provides" interfaces ipCM_1_0 and ipCM_1_0_Config of the composite component, and that the "provides" interface ipCM_1_0 of the component CM_1_0 is connected to a "requires" interface irCM_1_0 of the component CM_1_0_ConfiG.

With the graphic user interface of FIG. 23, the developer may add or exclude a specified component, thereby generating the new composite component.

Figure 24:
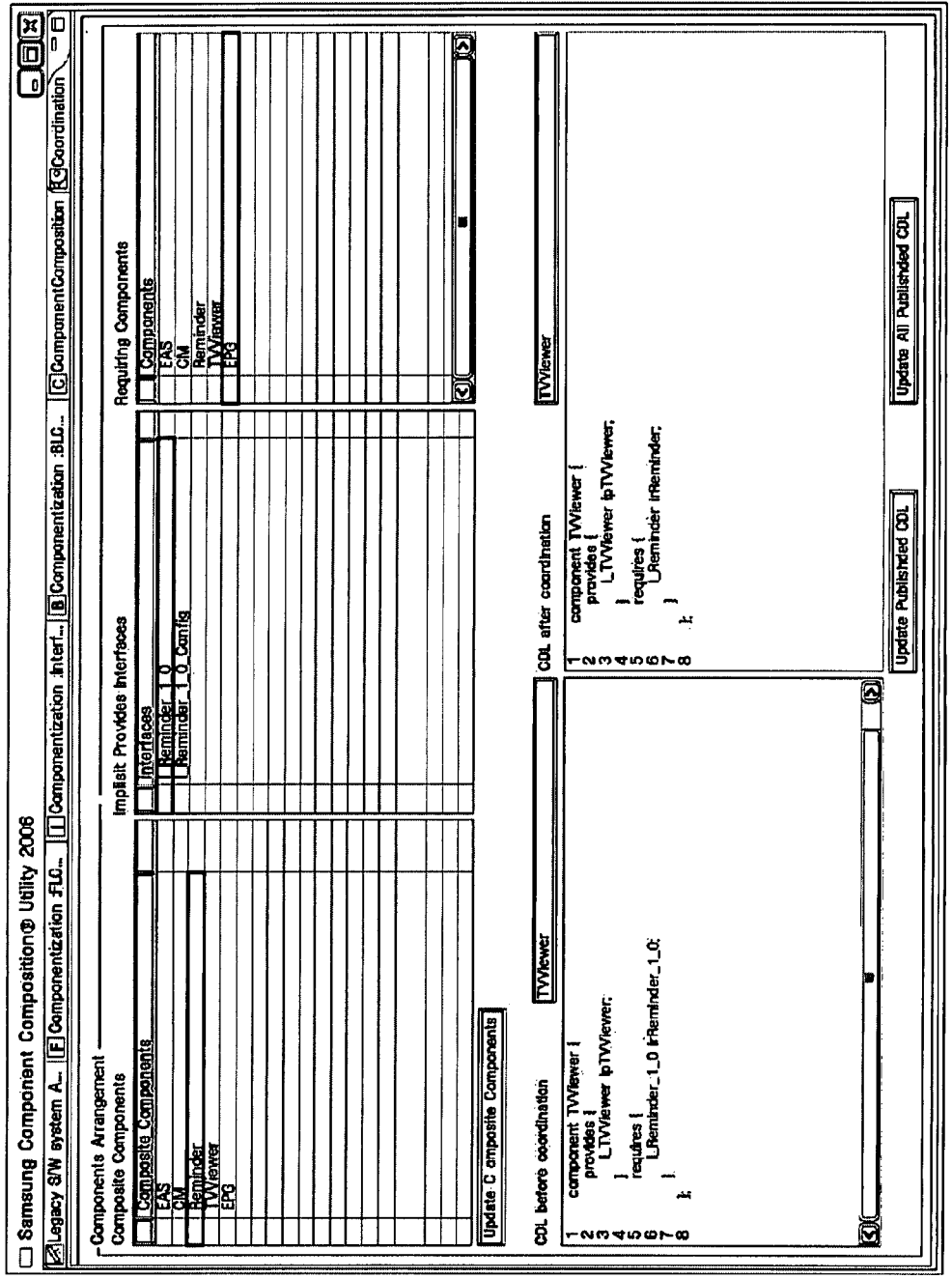
FIG. 24 is a diagram illustrating a case where a change in interface caused by a new composite component is detected.

FIG. 24 is a diagram illustrating a case where a change in interface caused by a new composite component is detected. FIG. 24 shows a graphic user interface in which a "requires" interface I_Reminder_1_0 named irReminder_1_0 is changed into a "requires" interface I_Reminder named irReminder.

The developer may select components to be added or excluded. Accordingly, the component apparatus 200 generates function level data that reflects the change information.

Meanwhile, although FIGS. 21 to 24 show function level data or interface data that is displayed on a graphic user interface, the developer may directly correct the displayed function level data or interface data.

Although the present invention has been described in connection with the exemplary embodiments of the present invention, it will be apparent to those skilled in the art that various modifications and changes may be made thereto without departing from the scope and spirit of the present invention. Therefore, it should be understood that the above exemplary embodiments are not limitative, but illustrative in all aspects.

As described above, according to the apparatus and method of componentizing a legacy system according to the exemplary embodiments of the present invention, time and money to construct the component model with respect to the legacy system can be reduced by automatically reconstructing software components, which are included in the system, according to the association between the components as abstract or logical modules to componentize the legacy system.

What is claimed is:

1. An apparatus for componentizing a legacy system, the apparatus comprising:
   a processor;
   a legacy code analyzing unit which analyzes an association between a plurality of legacy codes, which are included in the legacy system;
   a component generating unit which generates data for defining a plurality of components by referring to the analyzed association;
   a component analyzing unit which analyzes an association between the components; and
   a data updating unit which updates the data by referring to the association between the components,
   wherein each of the components comprises primitive components and a composite component,
   wherein the legacy code analyzing unit analyzes the association between the legacy codes by using at least one of header file reference information, function call information and symbol reference information, all of which are included in the legacy codes.

2. The apparatus of claim 1, wherein the legacy code analyzing unit analyzes the association between the legacy codes according to a prescribed analysis range by selectively using the at least one of the header file reference information, the function call information and the symbol reference information included in the legacy codes.

3. The apparatus of claim 1, wherein the component generating unit comprises:
   a primitive component generating section which generates primitive data for defining the primitive components;
   a component managing section which analyzes an association between the primitive components by using the primitive data; and
   a composite component generating section which generates the composite component comprising at least one of the primitive components by referring to the association between the primitive components.

4. The apparatus of claim 3, wherein the composite component generating section generates the composite component comprising the at least one of the primitive components and an additional composite component.

5. The apparatus of claim 3, wherein, if the composite component is generated, the component analyzing unit extracts interfaces that are provided or required by the primitive components and an additional composite component included in the composite component.

6. The apparatus of claim 5, wherein the data updating section updates the data by referring to the extracted interfaces.

7. The apparatus of claim 1, wherein the data comprises at least one of:
   function level data comprising an association between a first component of the plurality of components and a different component that provide or require interfaces with respect to each other, and if the first component is a composite component, an association between components included in the composite component;
   build level data comprising a library or execution file information generated from building the first component, library information required for building the first component, and if the first component is the composite component, build information on the components included in the composite component; and
   interface data comprising interfaces to be provided by the component.

8. The apparatus of claim 7, wherein the first component comprises at least one component unit directory formed by a combination of the plurality of legacy codes, and a build file generated from the building of the first component.

9. The apparatus of claim 1, further comprising a primitive component generating section which generates function level data, build level data and interface data.

10. A method of componentizing a legacy system, the method comprising:
    analyzing with a processor an association between a plurality of legacy codes, which are included in the legacy system;
    generating data for defining a plurality of components by referring to the analyzed association;
    analyzing with a processor an association between the components; and
    updating the data by referring to the association between the plurality of components,
    wherein each of the components comprises primitive components and a composite component,
    wherein the analyzing of the association between the legacy codes comprises using at least one of header file reference information, function call information and symbol reference information, all of which are included in the legacy codes.

11. The method of claim 10, wherein the analyzing of the association between the plurality of legacy codes comprises analyzing the association between the plurality of legacy codes according to a prescribed analysis range by selectively using the at least one of the header file reference information, the function call information and the symbol reference information included in the plurality of legacy codes.

12. The method of claim 10, wherein the generating of the data for defining the plurality of components by referring to the analyzed association comprises:
- generating primitive data for defining the primitive components;
- analyzing an association between the primitive components by using the primitive data; and
- generating the composite component comprising at least one of the primitive components by referring to the association between the primitive components.

13. The method of claim 12, wherein the generating of the composite component comprising at least one of the primitive component by referring to the association between the primitive components comprises generating the composite component comprising at least one of the primitive components and an additional composite component.

14. The method of claim 12, wherein the analyzing of the association between the primitive components by using the primitive data comprises extracting, if the composite component is generated, interfaces that are provided or required by the primitive components and the additional composite component included in the composite component.

15. The method of claim 14, wherein the updating of the data comprises updating the data by referring to the extracted interfaces.

16. The method of claim 10, wherein the data includes at least one of:
- function level data comprising an association between a first component of the plurality of components and a different component that provide or require interfaces with respect to each other, and if the first component is a composite component, an association between components included in the composite component;
- build level data comprising a library or execution file information generated from building the first component, library information required for building the first component, and if the first component is the composite component, build information on the components included in the composite component; and
- interface data comprising interfaces to be provided by the first component.

17. The method of claim 16, wherein the first component comprises at least one component unit directory formed by a combination of the legacy codes, and a build file generated from the building of the first component.

* * * * *